United States Patent [19]

Miller et al.

[11] Patent Number: 5,404,392
[45] Date of Patent: Apr. 4, 1995

[54] DIGITAL CELLULAR OVERLAY NETWORK (DCON)

[75] Inventors: Robert V. Miller; Victor S. Moore; Thomas K. Pate, all of Palm Beach, Fla.

[73] Assignee: International Business Machines Corp., Armonk, N.Y.

[21] Appl. No.: 713,899

[22] Filed: Jun. 12, 1991

[51] Int. Cl.⁶ .................................... H04M 11/00
[52] U.S. Cl. .................................. 379/60; 379/59; 455/33.2
[58] Field of Search .................. 379/58, 59, 60; 455/33.1, 33.2, 34.1; 370/95.1, 95.2, 95.3

[56] References Cited

U.S. PATENT DOCUMENTS

| | | |
|---|---|---|
| 4,280,020 | 7/1981 | Schnurr . |
| 4,383,315 | 5/1983 | Torng .................. 370/93 X |
| 4,512,013 | 4/1985 | Nash et al. . |
| 4,799,253 | 1/1989 | Stern et al. . |
| 4,831,373 | 5/1989 | Hess . |
| 4,833,701 | 5/1989 | Comroe et al. .................. 379/60 |
| 4,837,800 | 6/1989 | Freeburg et al. . |
| 4,876,740 | 10/1989 | Levine . |
| 4,887,265 | 12/1989 | Felix . |
| 4,912,756 | 3/1990 | Hop . |
| 4,914,651 | 4/1990 | Lusignan . |

Primary Examiner—Curtis Kuntz
Assistant Examiner—G. J. Oehling
Attorney, Agent, or Firm—George E. Grosser

[57] ABSTRACT

A Cellular Data Network (CDN) identifies, collects and utilizes otherwise unused or unusable air time, in an existing Advanced Mobile Telephone System (AMPS). A Digital Cellular Overlay Network (DCON) is provided for performing CDN utilizing an underlying AMPS, where the DCON is transparent, with respect to the AMPS, and takes full advantage of existing AMPS equipment to keep the cost of performing CDN to a minimum. The resulting digital network may be used for high speed non-interfering data communications, i.e., data communications that do not degrade the underlying system's capacity and capability (qualitatively) to handle voice traffic. Expanded use of well-known radio control signals, in particular "busy bits" and "dotting sequences," provides a DCON capable of performing CDN in both a reliable and flexible manner.

82 Claims, 9 Drawing Sheets

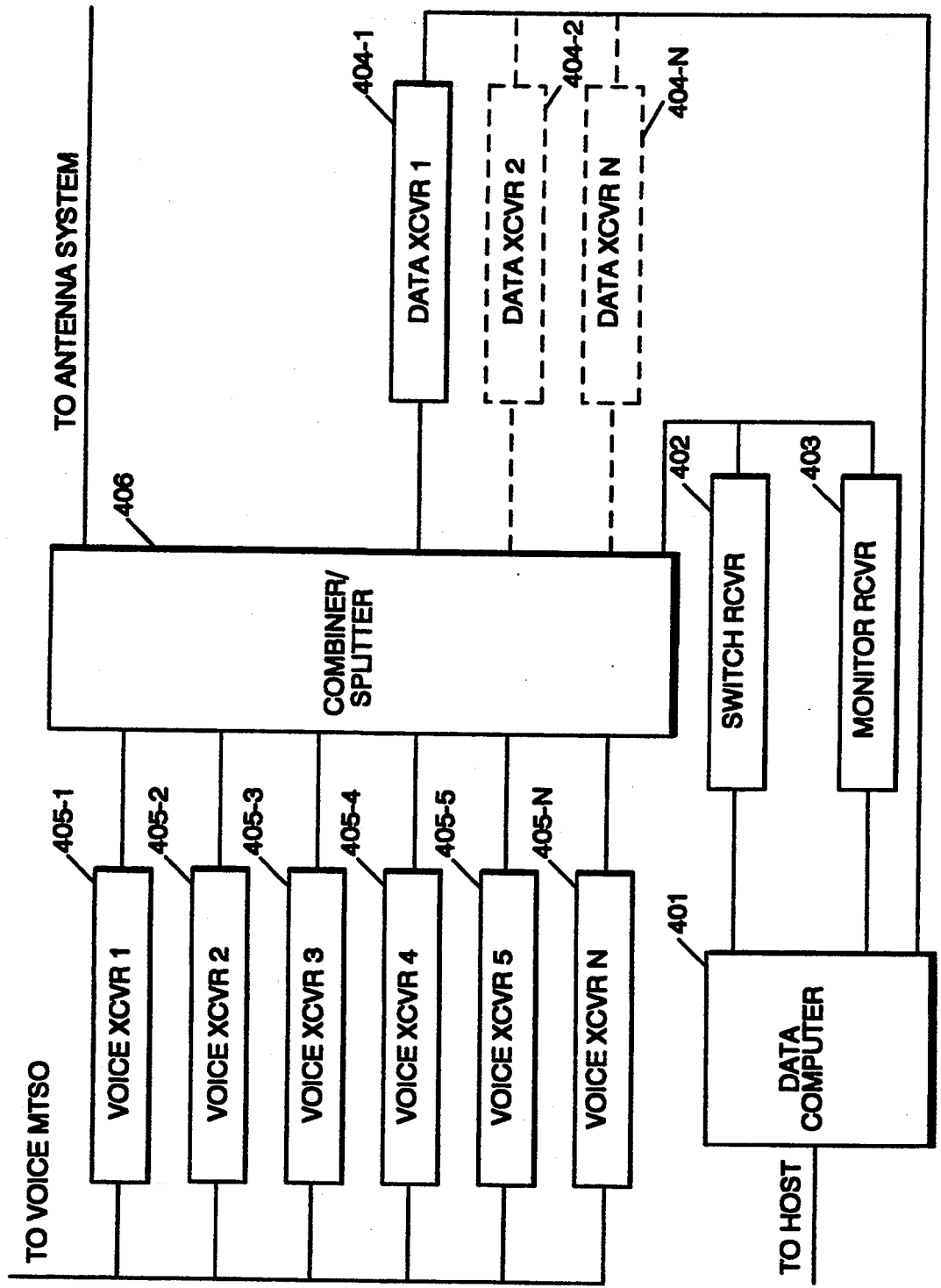

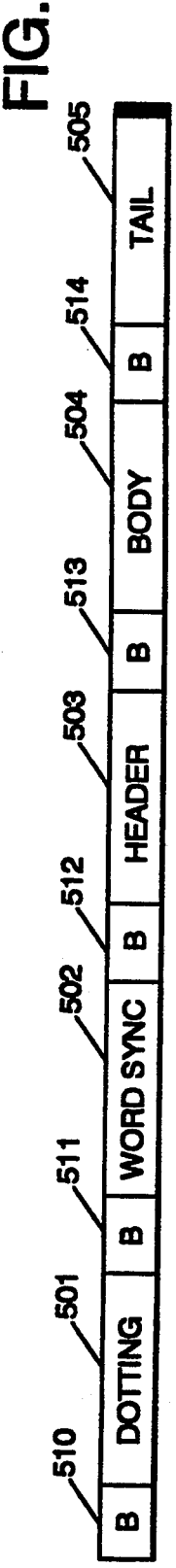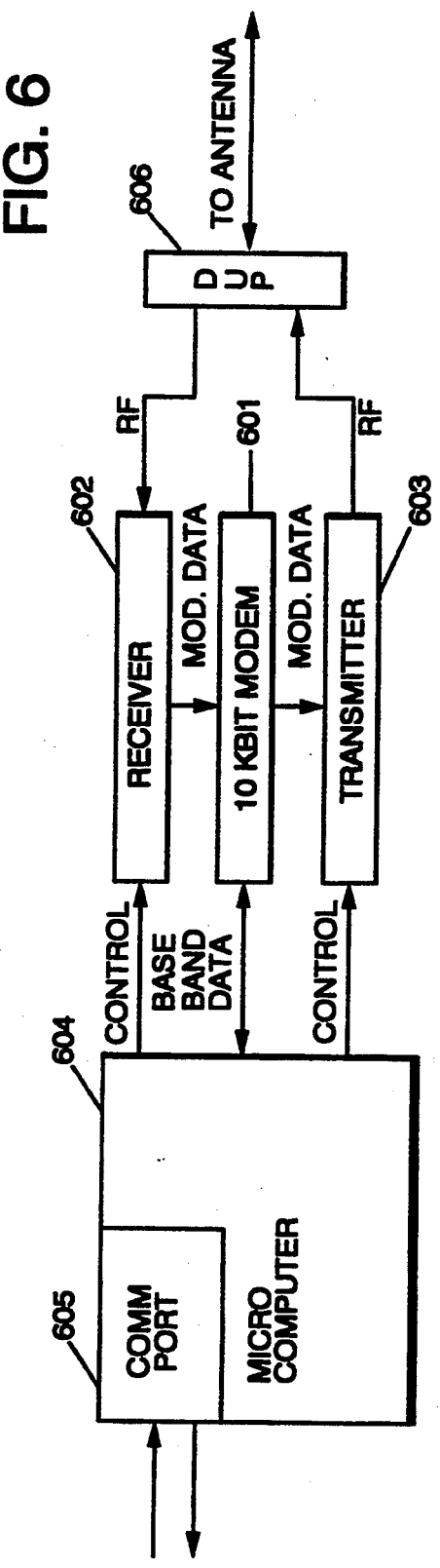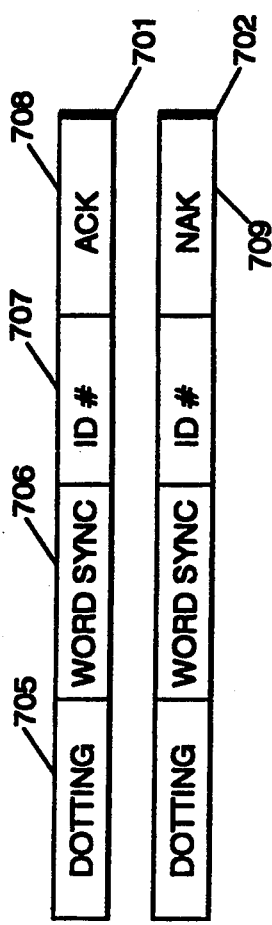

FIG. 8

| APPL  | <ID#> <DATA> |
| HOST  | <HEAD1> <DM#> <ID#> <DATA> <TAIL1> |
| DMTSO | <HEAD2> <CELL#> <ID#> <DATA> <TAIL2> |
| CELL  | <B> <DOT> <B> <WS> <B> <AT> <B> <ID#> <B> <DATA> <B> ...<DATA> <B> <ECC> |
| RADIO | <ID#> <DATA> |
| EMUL  | <DATA> |

FIG. 9

| EMUL  | <DATA> |
| RADIO | <ID#> <DATA> |
| CELL  | <DOT> <WS> <ID#> <DATA> <ECC> |
| DMTSO | <HEAD2> <ID#> <CELL#> <DATA> <TAIL2> |
| HOST  | <HEAD1> <ID#> <DATA> <TAIL1> |
| APPL  | <ID#> <DATA> |

FIG. 10A

APPL.
   1: ADD ID # TO THE DATA
   2: OUTPUT DATA TO HOST I/O

HOST
   1: DECIDE THAT DATA FOR ID# GOES TO A PARTICULAR DMTSO
   2: ADD DMTSO ID NUMBER DM#
   3: ADD HEAD1 AND TAIL1 FOR THE NETWORK BETWEEN THE HOST AND DMTSO
   4: BILL ID# FOR THE MESSAGE
   5: SEND THE MESSAGE ON THE NETWORK TO THE DMTSO

DMTSO
   1: REMOVE HEAD1, TAIL1 AND DM#
   2: APPLY THE ERROR DETECTION AND/OR CORRECTION UTILIZED BY TAIL1
   3: USE PATH TABLE (PT) TO SELECT WHICH CELL # TO SEND THE MESSAGE TO CELL # = PRI [ID#]
   4: ADD CELL# TO THE MESSAGE
   5: ADD HEAD2 AND TAIL2 FOR THE NETWORK BETWEEN THE DMTSO AND CELLS
   6: SEND THE MESSAGE ON THE NETWORK TO CELL#
   7: IF MESSAGE NAK RECEIVED THEN CONTINUE '8:', ELSE EXIT
   8: CELL # = SEC [ID#]
   9: SEND THE MESSAGE ON THE NETWORK TO CELL #
   10: IF MESSAGE NAK RECEIVED THEN SEARCH ALL CELLS FOR ID#, ELSE EXIT CELL# = CELL THAT RECEIVED QUERY FROM DATA RADIO ID#
   11: SEND THE MESSAGE ON THE NETWORK TO CELL#

FIG. 10B

CELL
1: REMOVE HEAD2, TAIL2, AND CELL#
2: APPLY THE ERROR DETECTION AND/OR CORRECTION UTILIZED BY TAIL2
3: ADD DOT, WS, AT, AND ECC FOR THE NETWORK BETWEEN THE CELL AND DRS
4: TRANSMIT THE MESSAGE TO THE DR
5: MONITOR COMPANION VOICE XCVR, RECOVER IF VOICE TRANSMISSION BEGINS
6: CONTINUOUSLY UPDATE THE ACTIVE TABLE (AT)

RADIO
1: BIT SYNC ON THE DOT SEQUENCE
2: BYTE FRAME SYNC WITH THE WS
3: APPLY ERROR CORRECTION AND/OR DETECTION SPECIFIED BY THE ECC
4: SAVE THE AT DATA
5: PASS THE ID# AND DATA TO THE TERMINAL EMULATOR SOFTWARE
6: MONITOR FOR LOSS OF CARRIER, USE AT TO RECOVER IF LOSS OCCURS

EMUL.
1: IF ID # = TERMINAL # THEN PASS THE DATA TO THE APPLICATION SOFTWARE

FIG. 11

EMUL.
  1: ADD ID # TO DATA
  2: PASS MESSAGE TO THE RADIO

RADIO
  1: ADD DOT, WS, AND ECC
  2: WAIT FOR ZERO BUSY BIT
  3: TRANSMIT MESSAGE TO THE CELL
  4: LISTEN FOR BUSY BIT, IF ZERO BEFORE MESSAGE ENDS
      THEN RECOVER

CELL
  1: BIT SYNC ON THE DOT SEQUENCE
  2: BYTE FRAME SYNC WITH THE WS
  3: APPLY ERROR CORRECTION ADD/OR DETECTION SPECIFIED
      BY THE ECC
  4: REMOVE DOT, WS, AND ECC
  5: ADD HEAD2, TAIL2, AND CELL # FOR THE DMTSO TO CELL
      NETWORK
  6: SEND THE MESSAGE ON THE NETWORK TO THE DMTSO

DMTSO
  1: REMOVE HEAD2, TAIL2, AND CELL #
  2: ADD HEAD1 AND TAIL1 FOR THE NETWORK BETWEEN THE
      HOST AND DMTSO
  3: UPDATE PRI AND SEC IN THE PATH TABLE (PT) IF
      PRI [ID #]I = CELL # THEN SEC [ID #] = PRI [ID #];
      PRI [ID#] = CELL #
  4: SEND MESSAGE ON THE NETWORK TO THE HOST

HOST
  1: REMOVE HEAD1, AND TAIL1
  2: APPLY THE ERROR DETECTION AND/OR CORRECTION UTILIZED
      BY TAIL1
  3: PASS THE DATA AND ID # ON TO THE APPLICATION

APPL
  1: RECEIVE DATA FROM HOST I/O FOR USER ID #

DIGITAL CELLULAR OVERLAY NETWORK (DCON)

BACKGROUND OF THE INVENTION

1. Field of the Invention

The present invention relates generally to mobile cellular telephone systems and more particularly to methods and apparatus for overlaying an existing Advanced Mobile Telephone System (AMPS) with a coexisting, transparent, digital network. The digital network may be used for high speed non-interfering data communications, i.e., data communications that do not degrade the underlying system's capacity and capability (qualitatively) to handle voice traffic.

2. Description of the Related Art

Mobile cellular radiotelephone service is presently readily available in many metropolitan areas around the world. The service is typically provided via cellular systems i.e., systems that have a coverage area divided into contiguous smaller coverage "cells" using low power transmitters and receivers. The limited cell area enables the channel frequencies in one cell to be reused in another geographically separated cell according to an established scheme. Thus, a large number of channels can be made available in a metropolitan area and service can appear to be identical to that of a standard telephone.

Cellular systems typically utilize one channel in each cell, called a "control channel", to receive requests for service from subscriber units to call other subscriber units and to instruct subscriber units (also referred to herein as "mobile telephone units") to tune to a frequency pair of a selected "voice channel" wherein a two-way (duplex) conversation may take place. The control channel continuously receives and transmits data and is the channel to which a mobile telephone unit automatically tunes when not in a voice conversational state.

In the prior art cellular telephone systems, telephone calls between two parties continue until their discussions are completed. Since both parties are continuously listening, either can ascertain that the discussions have been terminated and hang up. However, when making data calls on cellular telephone systems, the user is not continuously listening and, as a result, there may be long periods of time when there is no data activity although air time is being utilized. Since the user is billed for the actual air time utilized, the user is being charged at a relatively high rate for such long periods of inactivity.

Many applications, such as electronic mail, would find it advantageous to utilize an AMPS for data transmissions; however, such applications would not want to pay for day long voice calls. Also, a system capacity problem would be likely to result if data terminals (perhaps thousands of terminals coupled to a given network) competed with normal voice users for available system bandwidth.

A lower "bit rate" versus standard air time rates, would be both desirable and practical (for both the user and cellular company), if "scrap" air time could be identified, salvaged and be sold profitably by the cellular company. The existence of "scrap" air time (defined herein as unused and otherwise unusable air time) can easily be demonstrated based on the well known blocking and switching requirements of present day cellular telephone networks.

The U.S. Federal Communications Commission (FCC) requires cellular telephone companies to provide telephone services to subscribers on a 2% blocking basis. This means a subscriber is guaranteed to complete a call on the first try 98% of the time. To achieve this blocking ratio, cellular telephone cell sites have excess capacity in terms of available channels and time. For example, present day cell sites are known that have the capacity to handle 57 channels of voice traffic. Further, it is known that a typical cellular telephone call lasts approximately 2 minutes and that it takes approximately 15 seconds for cell site equipment to transition from one call to another.

The addition of excess capacity due to the blocking factor and transition time represents a considerable percentage of total telephone cell site time availability which cannot be utilized for conventional voice communication. Accordingly, it would, be desirable if methods and apparatus were provided to utilize this time for data transmissions, without interfering with normal voice traffic. Techniques for using this excess and otherwise unusable time, will be referred to hereinafter as "Cellular Data Networking" (CDN) techniques.

Furthermore, it would be desirable to provide a digital network suitable for overlaying an existing AMPS, where the digital network (1) coexists with and is transparent with respect to the AMPS; (2) does not degrade the AMPS's voice capability or capacity to handle voice traffic; (3) utilizes excess and otherwise unusable air time (the aforementioned "scrap" air time), i.e. performs CDN; and (4) utilizes existing AMPS equipment wherever possible to keep the overlay network cost to a minimum.

Many prior art systems are known which attempt to provide means for supporting data traffic in a cellular mobile telephone system, but fall short of providing for the aforestated desirable methods and apparatus.

For example Hess, in U.S. Pat. No. 4,831,373, teaches a method for dynamically allocating data channels on a trunked radio system. More particularly, the method taught by Hess monitors data activity during a predetermined time interval and if the activity is above a predetermined maximum level, additional channels are reserved for data use.

Obviously, voice capacity of an underlying cellular telephone system employing the teachings of Hess, would be degraded as the number of voice channels reserved for data traffic increases. Furthermore, no attempt is made by Hess to utilize excess and otherwise unusable air time to support CDN.

Freeburg et al, in U.S. Pat. No. 4,837,800, teaches a cellular data telephone system that addresses the problems of data calls being charged for long periods of inactivity and freeing up cellular channels assigned to inactive data calls. In particular, Freeburg et al teaches an improved cellular data telephone system and cellular data telephone that are responsive to a lack of data activity (after the expiration of a predetermined time interval) to disconnect a cellular telephone call while maintaining a landline telephone call to a data host. The system taught by Freeburg et al, is also responsive to subsequently occurring data activity by placing another cellular telephone call and reconnecting the landline telephone call thereto.

Freeburg et al does not, however, "yield" to voice traffic, again leading to the possible degradation of voice handling capacity, etc. as the number of data terminals attached to a network increases; nor does Freeburg et al teach, claim or even suggest the utilization of excess and otherwise unusable air time to support CDN.

Felix, in U.S. Pat. No. 4,887,265, is another example of a prior art cellular telephone system that addresses the problem of long periods of data call inactivity on cellular networks and the resulting problems of relatively high data call costs, radio channel spectrum waste, etc. In particular, Felix teaches a packet-switched cellular telephone system having a plurality of packet-switched radio channels each providing packet-switched data services to a plurality of cellular data telephones.

The system taught by Felix also provides for data calls to be "handed off" from one packet-switched radio channel to another on the basis of cellular telephone movement, signal strength, bit-error rate, channel data packet capacity, data packet traffic and/or data packet throughput.

Since cells may be of relatively small size, typically ten miles in radius, the likelihood of a mobile telephone unit travelling out of one cell and into another is high. To maintain uninterrupted communications, the mobile telephone unit is "handed off" between one cell and another. The cell systems track the mobile telephone unit and decide when a "handoff" operation is necessary to maintain high quality communication.

Typically, a mobile telephone unit is commanded by a high speed data message which interrupts audio communications on a voice channel to re-tune the transceiver to another frequency that presently is available in a new cell to which the mobile telephone unit is "handed off". This handoff operation requires a relatively short period of time (for example, 200–700 milliseconds), and the mobile telephone user is usually unaware of the occurrence.

However, when the mobile network is being utilized for data communication, significant data loss can occur during the time interval in which a handoff, power adjustment or similar operation takes place.

Felix recognized that it would be very desirable for owners of portable personalized computers to be able to couple them via a modem, a mobile telephone unit, and a cellular telephone system, to another remote computer. In order to do this and solve the aforementioned problem related to data loss, according to Felix, each cellular telephone in the system has the capability of generating a voice radio channel request to request voice service, and the capability of generating a data radio channel request to request data service. The Felix system includes a plurality of base sites that further include transceiver means having at least one radio signal channel for receiving both the voice radio channel requests and the data radio channel requests from the cellular telephone. However, separate shared data channels (separate from voice channels) are utilized for actual data communications.

Thus, Felix, although addressing (and solving) data call inactivity, handoff problems, etc., fails, like the aforementioned exemplary prior art, to utilize excess and otherwise unusable air time in a system primarily designed to support voice traffic, to support CDN. It should be noted that it would be a desirable characteristic of any methods and apparatus designed to implement a digital cellular overlay network and support CDN, to also provide for maintaining data integrity and avoiding data loss in handoff, power adjustment situations, etc.

Hop, in U.S. Pat. No. 4,912,756, teaches methods and apparatus for error-free digital data transmission during cellular telephone handoff operations, power adjusting operations, multipath fading, etc. In particular, Hop provides a system that includes a program executed on a first computer, that recognizes an imminent "interfering" operation, such as a handoff or the like, and sends a command over a voice channel to thereby blank the voice channel and halt data transmission or reception over the voice channel until the interfering operation is complete.

The completion of the interfering operation is detected by a three-wire bus which in turn allows the computer to recognize the completion of the interfering operation and reinitiate digital data transmission and reception over the voice channel.

Hop does not recognize a demand for voice operations as an interfering condition to interrupt data traffic. Moreover, Hop does not make any determination of unused and unavailable channel capacity for data transmissions; but rather temporarily halts data communications in progress over a given voice channel when an interfering operation is detected.

A further example of the present state of the art is Lusignan, U.S. Pat. No. 4,914,651, which teaches and improved AMPS cellular system where "non-interfering" digital communication channels are added to the existing analog or digital voice communications channels in the system by utilizing the frequency space between channels made possible by AMPS co-channel and adjacent channel frequency coordination procedures.

Lusignan notes that:

"Because of the crowded electromagnetic spectrum used for communications, it is useful to, in effect, squeeze extra communications channels into an already established communications band or system. In the microwave field, extra data channels are accommodated in an FDM-FM voice carrier known as a Data Under Voice service, which is provided by AT&T. Other technologies narrowing channels and allowing closer channel spacing and more capacity have been found to be valuable technological advancements. In addition, there is provided apparatus for multiplexing a number of speech and low speed data channels on a single data multiplex system.

In such techniques as above, technical complexity is required to add the additional capacity without diminishing service on the previous or existing system. This includes, of course, non-interference with the existing channels."

The "space division" technique taught by Lusignan, for supporting data transmissions in an AMPS, suffers from the significant potential for adjacent voice channel interference (although Lusignan is trying to avoid this problem) unless the system is operated at reduced power levels, relatively low operating speeds, utilizing limited bandwidth, etc.

In particular, according to Lusignan:

"Interference is prevented by reduction of power, selection of frequencies, proper modulation and demodulation techniques, and unique allocation to the channels in frequency and location".

Like the other exemplary prior art described hereinabove, Lusignan does not teach, claim or suggest a digital cellular overly network that supports CDN; nor does Lusignan provide a system capable of utilizing, for example, a full 30 Khz of voice bandwidth while supporting full power/high speed data operations in a way that does not interfere with voice traffic.

Notably, Lusignan also assumes a "hex" layout of 5 channels in a cell with no two adjacent channels abutting one another (again to minimize interference problems). It would also be desirable to provide an enhanced cellular data system that realizes the enhanced capacity of Lusignan without having any restrictions on the channel layout in a given cell.

To summarize, in view of the present state of the art as described hereinbefore, it would be desirable to provide methods and apparatus which utilize unused and unusable air time, in an AMPS, for data transmissions without interfering with normal voice traffic supported by the AMPS. In other words, it would be desirable to provide methods and apparatus which perform and support Cellular Data Networking in an AMPS. Such methods and apparatus would provide a mechanism for making lower cost "scrap" air time available for data communications.

Furthermore, it would be desirable to provide a transparent digital network suitable for overlaying an existing AMPS to take advantage of resident AMPS equipment to support CDN, without degrading voice capability or the AMPS's capacity to handle voice traffic, etc.

Still further, it would be a desirable characteristic of any methods and apparatus designed to implement a digital cellular overlay network and support CDN, to also provide for maintaining data integrity and avoid data loss in handoff, power adjustment situations, etc., and to be able to inform data terminals regarding the status of input channels, channel change requirements, etc.

Further yet, it would be desirable to provide a capacity enhanced cellular data system that does not place any restrictions on the channel layout in a given cell and that provides the desired enhanced capacity without placing restrictions on power, bandwidth utilization, speed, etc.

SUMMARY OF THE INVENTION

Accordingly, it is an object of the invention to provide methods and apparatus which can identify, collect and utilize unused and unusable air time in an AMPS (the aforementioned scrap air time), for data applications. In other words, it is an object of the invention to provide methods and apparatus suitable for performing CDN in an AMPS.

Furthermore, it is an object of the invention to be able to perform CDN without interfering with normal voice traffic supported by an AMPS.

It is yet another object of the invention to provide a transparent digital network suitable for overlaying an existing AMPS to take advantage of resident AMPS equipment to support CDN, without degrading voice capability (from a qualitative point of view), or the AMPS's capacity to handle voice traffic, etc. In other words, this object of the invention contemplates the provision of a Digital Cellular Overlay Network (DCON) for supporting CDN.

Still further, it is an object of the invention to practice CDN in the context of a DCON utilizing techniques that maintain data integrity and avoid data loss in handoff, power adjustment situations, etc., and which are able to inform data terminals coupled to the network regarding the status of input channels, channel change requirements, etc.

Further yet, it is an object of the invention to provide a capacity enhanced cellular data system that does not place any restrictions on the channel layout in a given cell and that provides the desired enhanced capacity without placing restrictions on power, bandwidth utilization, speed, etc.

According to one aspect of the invention, methods and apparatus are provided for performing CDN, i.e., identifying, collecting and utilizing the aforementioned "scrap" air time in an AMPS.

In particular, by way of specific example, apparatus is set forth for performing Cellular Data Networking (CDN) in an Advanced Mobile Telephone System (AMPS), wherein said AMPS includes a set of cellular telephone voice transceivers, each tuned to one of a preselected set of communication channels, and means for coupling each transceiver in said set of transceivers to an antenna to facilitate the performance of duplex radio communications over said set of channels, comprising: (a) a set of CDN companion data transceivers each of which may be utilized in place of a transceiver in said set of voice transceivers; (b) a set of RF sensors, each for detecting the presence of RF signals on the channel to which a given transceiver in said set of voice transceivers is tuned; and (c) analyzer means, coupled to said set of RF sensors, for determining the presence of an RF signal on the channel to which a particular transceiver in said set of voice transceivers is tuned and for selectively assigning a companion data transceiver to occupy the same frequency as said particular transceiver, for data transmission purposes, in an unused time slot.

Methods corresponding to the aforestated apparatus are also contemplated by the invention, i.e., methods for identifying, collecting and utilizing excess and otherwise unusable air time in the AMPS to support data applications.

According to another aspect of the invention, a Digital Cellular Overlay Network (DCON) is provided for performing CDN utilizing an underlying AMPS, where the DCON is transparent, with respect to the AMPS, and takes full advantage of existing AMPS equipment to keep the cost of performing CDN to a minimum.

In realizing a DCON capable of performing CDN, once again, the invention contemplates the use of an RF sensor, coupled to a means for analyzing RF sensor inputs (e.g. a computer), to detect which voice mode transceivers of the underlying AMPS are active. From this data the analyzer/computing means (e. g. a microprocessor) selects which frequencies are available for data traffic, determines when an assigned data channel is to be pre-empted to support a voice application, etc.

According to one embodiment of the DCON, the RF sensor (probe) is placed on the transmitter output portion of each voice transceiver of the AMPS, to detect actual (or imminent) voice transmissions. The sensor data is then coupled to the RF analyzer which can overlay an existing voice transceiver with a data transceiver tuned to the same frequency, whenever it is safe to do so.

The invention also is directed to methods and apparatus which contemplate the expanded use of well known radio control signals, in particular "busy bits" and "dotting sequences", to provide a DCON capable of performing CDN in both a reliable and flexible manner. In particular, the invention contemplates the use of a plurality of busy bits to aid data terminals in finding available data input slots (from the data terminals to a cell site), to control which data terminals get to use a given input slot, to direct data terminals to channel changes, etc. The busy bits may, according to the invention, be addressed to all data terminals on a channel or be addressed to a specific data terminal. Unique dotting sequences are used to specifically alert data terminals regarding communications from the cell site, while keeping normal cellular phones from confusing data signals with voice access signals.

The invention features methods, apparatus and network architecture designs that are suitable for opening up new business opportunities to cellular companies in the data transmission field, without taking away voice capabilities and voice revenue. In particular, the invention features the ability to utilize and sell "scrap" air time for data applications, enabling the time to be sold profitably at a lower rate than is charged for standard voice air time. Data application services and end users could obviously benefit from such a lower rate.

Still further, the invention features the ability to add enhanced data services capabilities to an existing cellular system in a manner which is transparent to the cellular system and which uses existing antennas, land, block houses, etc.

Further yet, the invention features being able to realize all of the aforestated features in the context of a data transmission system that is flexible, reliable and which is capable of operating at high speed, at full power and maximizing the use of available bandwidth, without requiring any specific patterns or layout of channels in the underlying AMPS.

Additionally, the DCON contemplated by the invention includes data terminals (radios) that are capable of making handoff decisions based on received signal strength and bit error rate, while the DCON itself is further capable of instructing the data terminals where to look for a data channel in a handoff situation.

These and other objects and features of the invention will be recognized by those skilled in the art upon reviewing the detailed description set forth hereinafter in conjunction with the accompanying Drawing.

BRIEF DESCRIPTION OF THE DRAWING

FIG. 4 depicts in greater detail the cell site shown in FIG. 1.

FIG. 5 depicts an exemplary message packet suitable for use in controlling the DCON contemplated by the invention.

FIG. 6 depicts, in block diagram form, the architecture of a data radio suitable for use in the DCON contemplated by the invention.

FIG. 7 depicts exemplary packets that may be sent by the data radio to acknowledge the proper receipt of a message packet and to indicate the failure to properly receive a message packet.

FIG. 8 summarizes message flow, in accordance with a preferred embodiment of the invention, from a host application program to a data radio emulator program.

FIG. 9 summarizes message flow, in accordance with a preferred embodiment of the invention, from a data radio emulator program to a host application program.

FIG. 10 sets forth a set of process steps implemented within an application program, host, DMTSO, cell site, data radio and emulator software, all designed, in accordance with the teachings of the invention, to support CDN in a DCON. In particular, the specified process steps support the message flow structure illustrated in FIG. 8.

FIG. 11 sets forth a set of process steps implemented by emulator software running in a data radio, the radio itself, cell site, DMTSO, host and application program, all designed, in accordance with the teachings of the invention, to support CDN in a DCON. In particular, the specified process steps support the message flow structure depicted in FIG. 9.

DETAILED DESCRIPTION

As indicated hereinabove in the objects of the invention, the DCON architecture for supporting CDN must coexist in a manner that is transparent with respect to an existing host voice mode cellular system. Both systems preferably use the same frequencies, backhall equipment, antennas, block house, AC power, duplexers, splitters, etc. In doing so, the DCON must not degrade or reduce the voice capability of the host cellular system.

It is not contemplated that the voice and CDN systems share the same Mobile Telephone Switching Office (MTSO) and/or Digital Mobile Telephone Switching Office (DTMSO) software (used for voice and data switching respectively), computers or active RF components, with one exception possibly being the use of shared RF power amplifiers.

Based on the aforestated requirements, it will be seen and demonstrated herein that the CDN and DCON concepts, to be described in detail hereinafter, will be applicable to most cellular systems without having to make the assumption that cell site vendor cooperation exists in order to perform the desired overlay.

Figure 1:
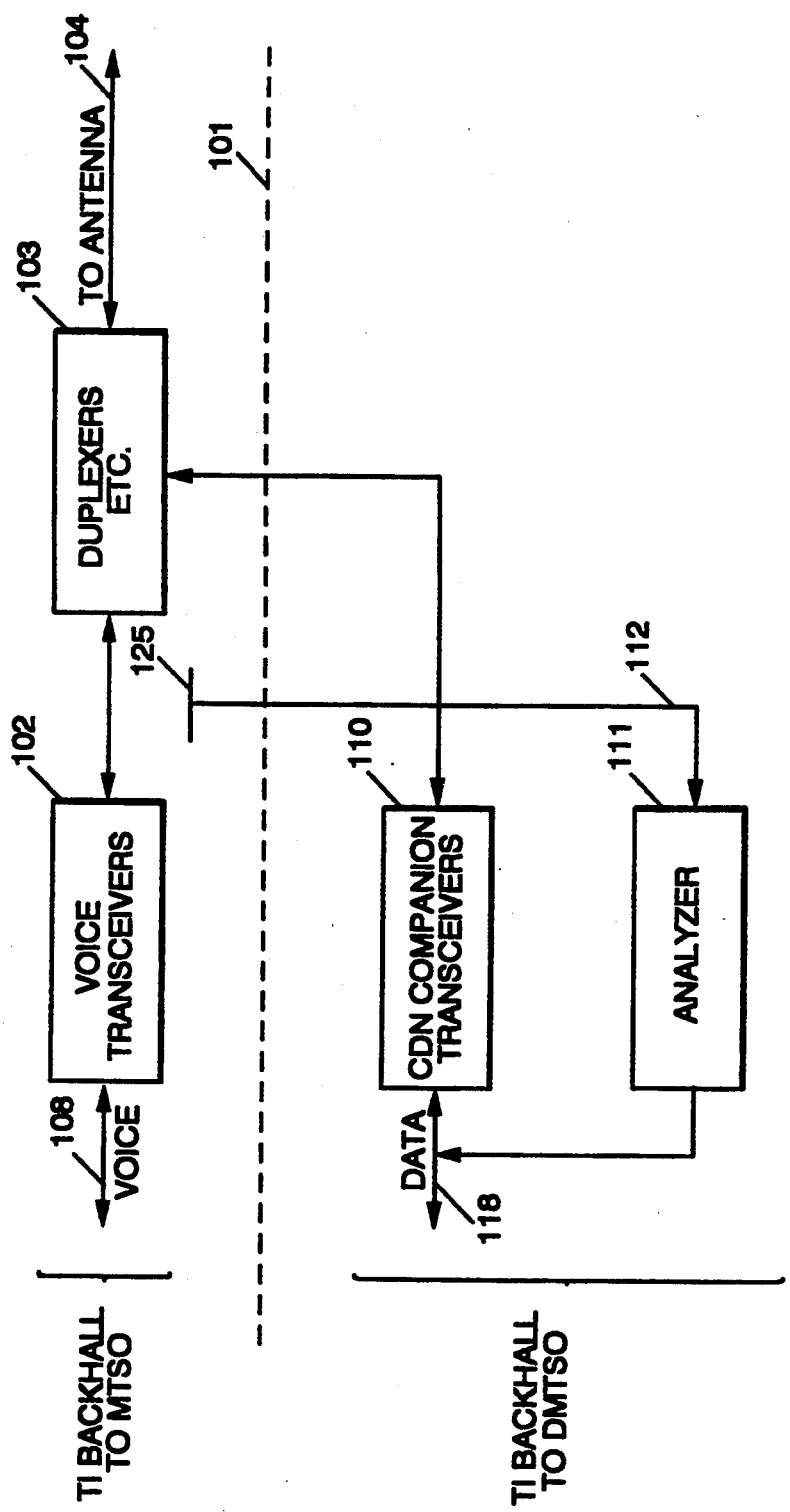
FIG. 1 depicts a simplified cellular telephone site in block diagram form, including the added equipment needed to support Cellular Data Networking (CDN) as contemplated by the invention.

Reference should be made to FIG. 1 to visualize the additional equipment needed to support CDN. FIG. 1 illustrates a simplified cellular telephone cell site. The equipment shown above dashed line 101 represents the equipment used in a normal cell site. The equipment shown below dashed line 101 (plus RF sensor 125) represents the added equipment necessary for performing CDN.

In particular, FIG. 1 depicts (above line 101) a set of cellular voice transceivers (including at least one transceiver), located at block 102; splitters, duplexers, etc. being located at block 103; and link 104 for coupling the aforementioned equipment to an antenna (not shown).

The added equipment to perform CDN, in accordance with a preferred embodiment of the invention, includes a set of CDN companion transceivers shown located at 110; RF sensor analyzer 111; and RF sensor 125 (one RF sensor for each voice transceiver located at 102), shown coupled to analyzer 111 via link 112.

Voice is shown coupled between transceivers located at 102 and a Mobile Telephone Switching Office (MTSO) via T1 backhall link 108. Data is shown coupled between companion CDN transceivers located at 110 and a Digital Mobile Telephone Switching Office (DTMSO) via T1 backhall link 118. Under control of analyzer 111, in a manner to be described hereinafter, data transmitted and/or received by one of the transceivers located at 110, can utilize a time slot not utilized by the voice transceivers located at 102 i.e., data can be overlaid on an unused or otherwise unusable voice channel under the right circumstances.

The CDN equipment, in order to meet the operating requirements outlined hereinabove, must determine when it can safely use the voice frequencies normally used exclusively by the voice mode transceivers. Each RF sensor (for example 125) and companion analyzer 111 (e. g., a microcomputer), detect which voice mode transceivers in set 102 are active. From this data, analyzer 111 can select which frequencies are available for data traffic.

Analyzer 111 turns the data transceivers (in set 110) on, assigns them to the unused voice channels, and begins interchanging messages with data terminals. The data terminals know which frequencies are available for possible data traffic and monitor them looking for data carriers. They may also use an access channel to acquire this information.

When a data carrier is heard, the data terminals lock onto the carrier and decode the data. Thus, the time not usable for voice traffic is turned into useful time for data traffic.

Should, a particular idle voice channel, being used for data, be needed again for voice, then the data transmission halts immediately in favor of the voice traffic. The data terminals listening to the channel detect immediately the loss of data and search automatically for another active data channel. It is well known that algorithms can be devised that minimize such data interruptions. For example, data channel allocation can be performed based on an algorithm that assigns the channel least likely to be used for voice communications based on a history of idle voice channels maintained by the analyzer, etc.

As indicated hereinabove, the "busy bits" included in a data packet protocol can direct the data terminals to go to another channel to continue receiving data. This will be described in greater detail hereinafter.

By detecting and analyzing the usage of voice transceivers, the data transceivers operate when the voice transceivers are idle. Thus, no connections are desired or required between the voice and data equipment. They both remain separate and operate orthogonally. This satisfies the no modification and coexistences requirements set forth hereinabove.

FIG. 1 also depicts the data inputs and outputs from the CDN equipment being routed to a DMTSO via a standard T1 microwave link. Other methods could be used, however the T1 approach is compatible with telecommunication standards, such as CCITT X.25, etc.

Figure 2:
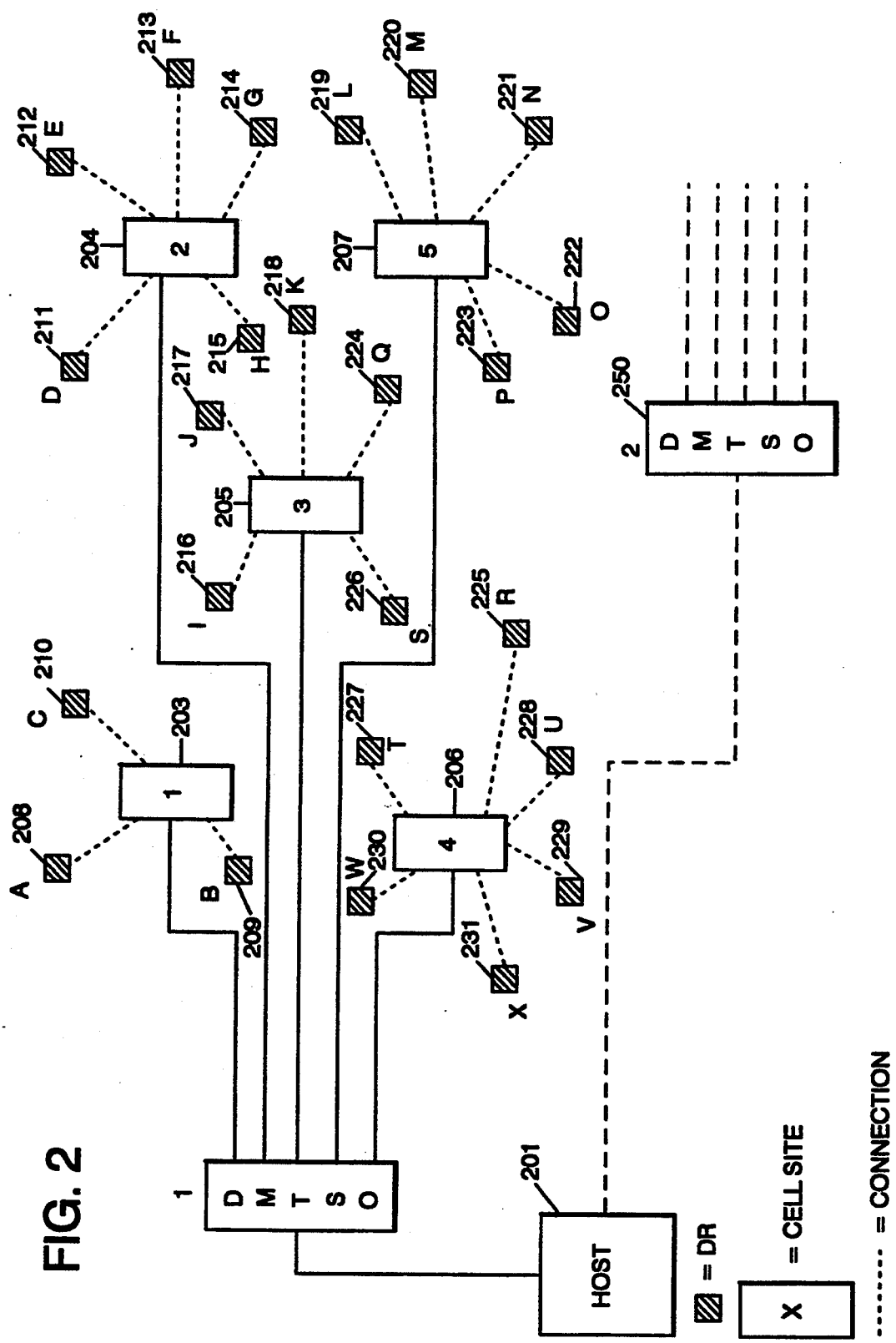
FIG. 2 depicts a Digital Cellular Overlay Network (DCON), as contemplated by the invention, in which CDN techniques may be performed.

FIG. 2 depicts a Digital Cellular Overlay Network (DCON), as contemplated by the invention, in which CDN techniques may be performed.

As indicated hereinbefore, a DCON as contemplated by the invention, overlays an existing Advanced Mobile Telephone Systems (AMPS) with a coexisting transparent digital network. The technique provides data access to a host computer from multiple data radios (data terminals) scattered throughout the cellular system.

Furthermore, as indicated hereinbefore, the DCON contemplated by the invention shares resources of the underlying AMPS to lower the DCON implementation costs without affecting the AMPS operation or capacity. DCON gives operational priority to AMPS and uses only excess capacity and unusable air time.

In accordance with the principals of the invention, FIG. 2 illustrates a DCON system that includes a host computer, 201; a Digital Mobile Telephone Switching Office (DMTSO), 202; multiple cell sites (1 to 5), shown as sites 203–207 respectively; and a plurality of data radios (A to X), shown as data radios 208–230. Dotted lines denote RF transmission paths between data radios and cell sites. Dashed lines show that multiple DMTSOs (such as DMTSO 250) can connect to a single HOST. It is also true that multiple HOSTs can connect to one DMTSO.

Host computer 201 executes applications, protocol software, and billing programs. The host computer itself is not limited to any particular type of computer by the invention. Typically, computer 201 is selected to support a particular user application. Applications view the DMTSO (such as DMTSO 202) as a terminal controller. The fact that the DMTSO talks to data radios via cell sites is hidden from view. Messages flow to and from the DMTSO network into the host computer as they would from any other network.

Host computer 201 charges message owners for using the DMTSO network. It records the number and length of each message sent by each network user. This data passes through a billing algorithm which sets a price for the users network activities. For example, billing by the bit and/or message are schemes readily implemented on host computer 201.

Sometimes the application code needed by a data radio resides on a computer other than the host computer 201. In such cases, the host computer 201 simply passes the data through the billing algorithm and onto another host via a network or direct leased line. Often this network or leased line operates differently from the DMTSO network. In these cases the host converts the DMTSO protocol to whatever protocol the other network requires.

The DMTSOs manage the data network between the host and cell sites. Each DTMSO, like DTMSO 202, receives messages from the host and sends the messages to the correct cell site for transmission to the addressed data radio (DR). Return messages from data radios are received by the cell sites and passed to the DMTSO for transmission to host computer 201.

According to the invention, each DMTSO, such as DMTSO 202, may be realized by a commercially available MTSO for supporting voice applications, with the software in the DMTSO being designed to support specific data oriented transmission functions, to be more particularly described hereinafter with reference to FIGS. 3 and 8–11.

Furthermore, according to one embodiment of the invention, each DMTSO manages the data network with three tables. The first, referred to herein as the Path Table (PT), records the most likely cells, (a primary cell "PRI" and a secondary cell "SEC"), where a DR can be reached. PRI denotes the last cell through which the DR sent a message. SEC is the last cell other than PRI through which DR sent a message.

The second table, referred to herein as a Name Table (NT), relates nicknames to specific DR id numbers (ID#). Nicknames, being bit wise shorter than id numbers, reduce addressing overhead.

The third table, referred to herein as the Roam Table (RT), holds the cell numbers for all cells that surround another cell. The RT gives the cell numbers where a DR might be found when the DR cannot be reached in either the PRI or SEC cells.

Figure 3:
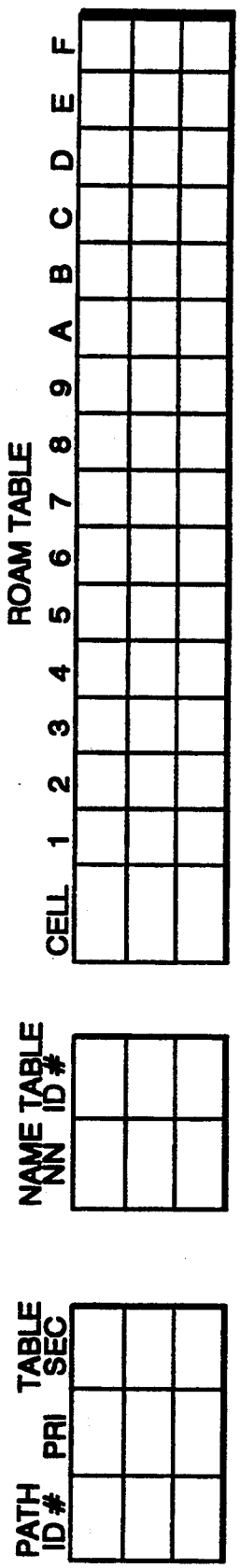
FIG. 3 depicts a set of tables that, according to one embodiment of the invention, may be used in managing the Digital Mobile Telephone Switching Office (DMTSO) portion of a DCON.

FIG. 3 depicts one embodiment of the set of tables described hereinabove. PT 301 is shown to include an ID# entry column, a PRI number entry column, and a SEC number entry column. Each row identifies the PRI and SEC cell number associated with the ID# specified in the given row.

Each row of NT 302 can be seen to provide space for holding an ID# nickname and corresponding ID#. Finally, RT 303 can be seen to include, for each row entry, a listing of all the cells that surround the cell designated in a given row. RT 303 is shown to include space for identifying surrounding cells 1-F for a given row entry.

It will become evident from the description of how messages are sent and received in a DCON, that the aforementioned set of tables may, according to one embodiment of the invention, be used by the DMTSO in managing the DCON.

Each DMTSO (like DMTSO 202) sends messages to a cell site by indexing into PT with the DR ID# to fetch both the PRI and SEC cell numbers. Next, the message is sent to cell PRI. Cell PRI either acknowledges (ACKs) the message or rejects it (NAKs). An ACK means the message was delivered to the addressed DR.

A NAK means just the opposite. Either the message was not heard by the DR or it could not be received correctly. In both of these cases (resulting in a NAK), the DMTSO must look for another path to the DR. It tries SEC first. Next, From the RT, the DMTSO tries the cells that surround PRI and SEC. Failure again expands the check to the cells that surround the cells that have already been checked. The process continues as an expanding circle centered on PRI until the DR is found.

A simpler alternate technique, but one that consumes more system capacity, would be to broadcast the message throughout the cellular system and wait for a response. The cell that receives the response would become the PRI cell.

Next, the way in which messages are received by a DMTSO will be described in detail.

A given DMTSO (e.g., DMTSO 202) asynchronously receives messages from all cell sites in the cellular network to which it is attached. Each message contains the originating DR id number and the cell site number that received the message. The cell site number becomes the PRI for the DR. The previous PRI, if different from the current PRI, becomes the SEC. The message, with the cell site number stripped out, gets passed onto the host computer 201.

The DMTSO receives only good messages from cells. This is true largely because cells buffer received messages. They also take care of ACKs and NAKs with DR units.

Each DMTSO, according to the invention, includes switch control means (such as a digital computer) for operating a DMTSO in the manner described herein. In particular, according to a preferred embodiment of the invention, a commercially available IBM RISC 6000 computer may be utilized to implement a DMTSO as contemplated herein. The invention is not intended to be limited to systems that utilize any particular type of computer to support the function of a DMTSO.

FIG. 4 depicts in greater detail the cell site shown in FIG. 1, and illustrates how DCON components connect into an existing AMPS cell site. The DCON elements shown in FIG. 4 are the Data Computer 401, Switch Receiver 402, Monitor Receiver 403, and the Data Transceivers (Xcvrs) 404-1 thru 404-n. The depicted components in the underlying AMPS are voice transceivers 405-1 thru 405-N, and combiner/splitter 406.

Data computer 401 (DC) continuously sequences Monitor Receiver 403 (MR) through cell site channels 1 to N (to which the corresponding N voice transceivers, shown as 405-1 thru 405-N in FIG. 4, may be tuned). Monitor receiver 403, coupled to combiner/splitter 406, listens for RF carriers on each channel. This may be accomplished via the RF sensor arrangement depicted in FIG. 1. Channels without carriers are said to be inactive and are posted, by computer 401, in an Activity Table (AT).

According to one embodiment of the invention, entries in the AT are sorted by computer 401 based on channel activity. The top table entry being the free channel with the least activity over a predetermined time period. The top entry is 0 when all channels are active.

When the top AT entry is not zero, computer 401 sets data transceiver 404-1 (DATA XCVR 1) to the frequency specified by the top AT entry. This frequency assignment does not change again until the present frequency is needed for voice traffic.

DATA XCVR 1 (DX1) continuously transmits a RF data carrier recognizable to Data Radios (DR), such as radios 208-230 shown in FIG. 2. The carrier should not be recognizable by normal cellular phone receivers. This can be accomplished by making the data carrier "dotting sequence" (a control sequence of bits) different from that expected by the normal cellular phones.

According to the invention, once DX1 (404-1) begins carrier transmission, DC 401 starts sending data packets. Packets are either addressed to specific DR units, or globally addressed to all units, or have no address at all. Those with no address are just filler packets and are sent when the DC has no DR packets.

When a DR receives a data packet that was directed to it, the DR signals DC 401 with an "ACK" signal if the data was received properly; otherwise a "NAK" signal is sent. NAKs cause DC 401 to resend the data packet.

According to the invention, all message packets (often called just messages) sent to DR units contain a dotting sequence, word sync, busy bits, header, body, and tail. FIG. 5 depicts an exemplary message packet suitable for use in controlling the DCON contemplated by the invention.

The dotting sequence (shown at 501) synchronizes the DR to the cell site bit clock. The word sync (shown at 502) synchronizes the DR to cell site byte frames. The header (shown at 503) contains all addressing and supervisory information. The body (shown at 504) holds the data to be conveyed. The tail (505) ends the message.

Busy bits B (such as 510, 511, 512, 513 and 514) occur throughout the message, one between each of the five message components described hereinabove. Other busy bits occur after every 5 bytes in the message body. A different arrangement for busy bits could be employed without changing the DCON concept. Messages inbound to cells from DRs have no busy bits.

DC 401 adds to the message header the top few AT entries. This data directs a DR to the next frequency, should the present one be required by voice traffic.

Switch receiver (SR) 402 (shown in FIG. 4) determines when this occurs. SR 402 monitors the voice transceiver (VR) in the set of voice transceivers 405-1 thru 405-n, that uses the same channel presently used for data, and detects when the VR starts transmitting. SR 402 detects the event and signals DC 401 to switch the corresponding data transceiver from the current channel to the next available one as determined by the AT. SR 402 may be realized by an RF sensor and/or an arrangement, such as the one described in the above referenced Hop patent, for detecting impending interfering operations.

A switch may be ordered during a message and results in the message being destroyed. In such a case, according to one embodiment of the invention, DC 401 notes the loss and notifies the DMTSO, which resends the message. When the top AT entry is zero, the data transceiver stops transmitting until another inactive channel occurs.

DR units detect the loss of a data carrier, and automatically switch to the next available channel as specified by the AT entries sent in the last received message header. It should be noted that all DR units keep the header AT information from messages regardless of address. Should, for some reason, the channel chosen by a DR not match the channel chosen by DC 401, the DR will search channels 1 to N looking for the distinctive data carrier.

According to one embodiment of the invention, if the data carrier is not found, meaning the current cell has no data carrier, the DR will search all frequencies looking for the best data carrier. It then must send a message to the corresponding cell so the DMTSO knows where to route future messages.

The DMTSO sends messages to DC 401, which in turn transmits the message to the appropriate DR. After this transmission one of 3 scenarios occurs:
1. DC 401 receives an ACK from the DR,
2. DC 401 receives a NAK from the DR,
3. or DC 401 receives no response from the DR.

In scenario 1 above, the DR received the message without detecting any problems. Accordingly, DC 401 need take no further action on the messages behalf.

In scenarios 2 and 3 the message was not properly received. According to one embodiment of the invention, scenario 2 causes DC 401 to retransmit the message; while the DMTSO learns about the NAK only when N attempts by DC 401 fail to deliver the message to the DR. The DMTSO treats NAKs and scenario 3 alike.

In scenario 3 the DMTSO sends the message to data computer in cell SEC. Again, all three scenarios are possible. The first two are treated the same as explained above. However, case 3 forces the DMTSO to search for the DR throughout the entire cellular system.

As indicated hereinabove, the DMTSO searches for a DR by sending the message to the data computers in the cells that surround the PRI cell. Next, the DMTSO tries the cells that surround these cells. In other words, the pattern resembles a circle spreading out around the PRI cell.

A simpler technique was also alluded to hereinbefore; one which causes the message to be broadcast throughout the cellular system and wait for a response. The cell that receives the response would become the PRI cell. This approach will, however, consume more system capacity and therefore may be undesirable.

It should be noted at this point, for the sake of completeness (but for illustrative purposes only), that the voice transceivers depicted in FIG. 4 may be realized by commercially available Novatel voice transceivers; that the data transceivers depicted in FIG. 4 may be realized by the commercially available Novatel "Data Seeker" transceiver; and that the depicted monitor receiver, switch receiver and combiner/splitter, are also all commercially available from Novatel as standard cell site equipment.

Data computer 401 may be realized by a commercially available IBM PS/2 family type computer, which may be readily programmed by one skilled in the art to support the cell site functions described herein with reference to FIGS. 4 and 8-11.

Next, the way in which messages are received from data radios in the novel DCON will be described in detail. Data computer units (one associated with the CDN equipment at each cell site), such as computer 401, signal DR units when they are prepared to receive data by lowering the busy bit within the transmitted data signal.

As soon as a data computer receives a message it raises the busy bit to prevent other DR units from transmitting.

A situation could exist where two DR units both see a zero busy bit and start transmitting. In this case both units interfere with one another and the cell site will not be able to decipher both messages. According to one embodiment of the invention, the data computer at the cell site alerts the two DR units about this condition by lowering the busy bit during message reception. The DR units interpret this as a signal to cease transmitting.

FIG. 6 depicts, in block diagram form, the architecture of a data radio suitable for use in the DCON contemplated by the invention. In comparison to a cellular phone, the absence of voice, SAT, and signalling circuits should be noted. The other components shown in FIG. 6, including 10 Kbit modem 601, receiver 602, transmitter 603, microcomputer 604 including communications port 605, duplexer 606, and the data and control links as shown, are the same as found in a normal cellular phone.

DR units suitable for practicing the invention could be cellular phones (such as those manufactured and sold by NOVATEL), loaded with different software. The software need only implement the functions to be set forth in detail hereinafter. In particular, the radio itself may be realized by a commercially available Novatel "CRM" device, which includes a Zilog Z-80 microprocessor.

When a DR desires to send a message to the DMTSO, it examines the data channels which it hears and from among these it selects a preferred one. One channel gets preferred over another based on signal strength and channel utilization. Among equally busy channels the stronger one becomes the preferred channel. However, when channels vary in utilization, a very busy but strong channel may be waived in favor of a weaker less utilized one. By doing this the DR helps divide system capacity among the users. Such techniques are well known to those skilled in the art.

According to one embodiment of the invention, after selecting a data channel, the DR listens for a zero busy bit within the data signal. A zero means the cell site is waiting for a new message. Upon seeing the zero, the DR transmits its message.

When the transmission starts the busy bit, for this embodiment of the invention, should go to and remain at 1 for the entire transmission. Should it rise to a 1 and fall again to zero before the transmission completes, then two DR units must simultaneously be transmitting and destroying each other's data. At this point both DR units stop transmitting and each waits a random amount of time before attempting new transmissions.

As for receiving a message from the cell site data computer, all DR units monitor a DC data channel. Whenever one data channel becomes unusable or unavailable a search begins to find another. The header within all messages contains the top few AT entries for the cell being utilized. These values are saved by all monitoring DR units and assist DR units to find the next available channel when the present one becomes unavailable.

The header also contains addressing information. Each monitoring DR compares its address to their own. Matching address cause the DR to receive the message and pass the data portion onto the resident terminal application software. The data then passes through the provided port (e.g. an RS232 port), shown in FIG. 6 as port 605. Other data transfer techniques could equally be used.

After successful packet reception, the DR, according to a preferred embodiment of the invention, sends the data computer an ACK packet. Once again, the DR sends the DC a NAK when it fails to properly receive a packet that contains the DR address. Optionally, ACKs and NAKs may include error detection and correction information.

FIG. 7 depicts exemplary packets that may be sent by the data radio to acknowledge the proper receipt of a message packet and to indicate the failure to properly receive a message packet. In particular, FIG. 7 depicts packets 701 and 702 for indicating the proper receipt of a message, and the failure to properly receive a message, respectively. The exemplary packet 701 includes the appropriate dotting sequence (at 705), word sync (at 706), unique radio ID number (at 707), and an acknowledgement signal stored at 708. The exemplary packet 702 includes the same information, except that the ACK information (portion 708 of packet 701) is replaced by a NAK signal (which may include error detection and correction information) shown at portion 709 of packet 702.

With respect to handoffs, unlike normal cellular radio, the DCON contemplated by the invention has no explicit method for the DMTSO to hand one DR off to another cell site. Rather, the DR determines when it becomes advisable to switch from one cell to another.

The criterion for switching employs received signal strength, data error rates, and channel utilization. When one or more of these factors becomes unfavorable, the DR searches for another data channel to use. It may find this channel within the current cell (cells may have more than one data channel) or it may find it in another cell. To achieve the cell switch, the DR sends the DMTSO a message via the new cell. This causes the DMTSO to post the new cell as the PRI cell for the respective DR.

Putting the responsibility for cell handoffs into the DR removes a considerable burden from the DMTSO. Besides, the DR knows what it hears best and when it should switch alliances from cell to cell.

FIGS. 8 and 9 summarize message flow, according to a preferred embodiment of the invention, between the host application and data radio emulation software (this message flow is depicted in FIG. 8), and between the data radio emulator and the host application (this message flow is depicted in FIG. 9).

The symbols used in FIGS. 8 and 9 are defined as follows:

| | | |
|---|---|---|
| <id#> | = | unique id number assigned to a data radio; |
| <data> | = | actual data to pass between the application and terminal emulator; |
| <dm#> | = | unique id number assigned to the DMTSO; |
| <head1> | = | packet header for the host/DMTSO network; |
| <tail1> | = | packet error detection and/or correction bits; |
| <head2> | = | packet header for the DMTSO/cells network; |
| <tail2> | = | packet error detection and/or correction bits; |
| <b> | = | busy bit, 0 = not busy, 1 = busy; |
| <dot> | = | a unique bit set employed to achieve bit synchronization; |
| <ws> | = | a unique bit set employed to achieve byte frame synchronization; |
| <AT> | = | first few entries from the activity table; |
| <ecc> | = | packet error detection and/or correction bits; |
| <cell#> | = | cell site number of cell that received the packet. |

With reference to FIG. 8 it can be seen that, according to the invention, the application program adds the id number to the data and outputs the combined id number and data message to the host.

In turn, the host decides which DMTSO to route the data for a particular id number, and adds the DMTSO id number (dm#) to the message that includes the data radio id number and the actual data. The host then embeds this information between <head1> and <tail1>; bills the data radio to which id number is uniquely assigned, for the message; and sends the message on the network to the DMTSO.

The aforementioned steps plus the steps then utilized by a DMTSO, cell site, data radio and emulator software to communicate the data from the DMTSO to the emulator software are, according to a preferred embodiment of the invention, specified in FIG. 10 as a table of process steps. The process steps within each portion of the DCON architecture (such as the data radio, DTMSO, etc.), may be readily implemented by those skilled in the art by using well know techniques to, for example, program a digital computer, microprocessor, etc., supporting the operation of the relevant portion of the architecture. FIG. 10 should be read in conjunction with FIG. 8 to fully appreciate the message flow from application program to emulator program.

FIG. 9, as indicated hereinabove, illustrates the message flow contemplated by the invention, between a given data radio emulator program, and the host application program (i.e., message flow in the opposite direction from that described with reference to FIGS. 8 and 10.

The actual process steps involved in sending a message from an emulator running within a data radio terminal, to the application program running within the host, according to a preferred embodiment of the invention, is set forth with reference to FIG. 11. When reading FIG. 9 in conjunction with FIG. 11, it becomes clear that once again, the process steps needed to be implemented at each level of the DCON architecture, are easily realized by, for example, applying well known programming techniques to the processing unit(s) that supports a given level of the architecture.

Having fully described the CDN and DTMSO concepts, an alternate embodiment of the invention will now be set forth that contemplates an expanded (and preferred) use of busy bits to control a DCON.

According to this alternate embodiment of the invention, <b> (i.e., the busy bit information), may be expanded from the single bit used in prior art systems, to include a plurality of bits which add flexibility insofar as controlling the DCON is concerned.

In particular, for example, a 2 bit busy bit field could be utilized to not only indicate whether or not a channel is busy, but could also be used to indicate that a channel is to be changed, that a particular data radio is to transmit while the others listening for busy bits are to remain silent, etc. Indeed, when two or more bits are used in the busy bit field (n bits where n is greater than 1); then $2^n$ control choices are possible. The invention takes advantage of this feature to be able to instruct data radios when, for example, to change channels.

What has been described in detail hereinabove are methods and apparatus for performing CDN in the context of a DCON. These methods and apparatus, together with the novel DCON architecture, the embodiment of the invention that utilizes busy bits for expanded control purposes, etc., meet all of the aforestated objectives.

As previously indicated those skilled in the art will recognize that the foregoing description has been presented for the sake of illustration and description only. It is not intended to be exhaustive or to limit the invention to the precise form disclosed, and obviously many modifications and variations are possible in light of the above teaching.

The embodiments and examples set forth herein were presented in order to best explain the principles of the instant invention and its practical application to thereby enable others skilled in the art to best utilize the instant invention in various embodiments and with various modifications as are suited to the particular use contemplated.

It is intended that the scope of the instant invention be defined by the claims appended hereto.

What is claimed:

1. A method for performing Cellular Data Networking (CDN) in an Advanced Mobile Telephone System (AMPS), wherein said AMPS includes a set of cellular telephone voice transceivers, each tuned to one of a preselected set of communication channels, and means for coupling each transceiver in said set of transceivers to an antenna to facilitate the performance of duplex radio communications over said set of channels, including at least one data transceiver, and a set of sensors coupled to each transceiver in said set of transceivers, comprising the steps of:
   (a) determining when there is unused air time to switch a given one of said at least one data transceiver onto the channel to which a particular one of the transceivers in said set of transceivers is tuned;
   (b) determining when to turn said given data transceiver off based on sensing a demand for the channel to which the given data transceiver is tuned by said particular transceiver;
   (c) identifying time slots that are unused by said AMPS on each of said channels; and
   (d) assigning selected unused time slots identified in step (c) for data transmission purposes.

2. A method as set forth in claim 1 wherein said step of identifying further comprises the steps of:
   (a) determining which of said channels in said AMPS are not being utilized by said voice transceivers; and
   (b) placing each of said channels that is not being utilized by a voice-transceiver into an assignment pool from which a channel is assigned for data transmission purposes.

3. A method as set forth in claim 2 wherein said step of assigning further comprises the steps of:
   (a) selecting an available channel from said pool to be used for data transmission purposes;
   (b) tuning a data transceiver to the selected channel; and
   (c) transmitting data, via said data transceiver, over said selected channel.

4. A method as set forth in claim 1 wherein said step of identifying further comprises the step of sensing RF signals on at least one of the channels associated with the voice transceivers in said set of cellular telephone voice transceivers.

5. A method as set forth in claim 4 wherein said step of assigning further comprises the step of analyzing the RF signals sensed in said step of identifying to determine which of the channels assigned to the respective voice transceivers are not being used.

6. A method for performing Cellular Data Networking (CDN) in an Advanced Mobile Telephone System (AMPS), wherein said AMPS includes a set of cellular telephone voice transceivers, each tuned to one of a preselected set of communication channels, and means for coupling each transceiver in said set of transceivers to an antenna to facilitate the performance of duplex radio communications over said set of channels, comprising the steps of:
   (a) identifying time slots that are unused by said AMPS on each of said channels;
   (b) assigning selected unused time slots identified in step (a) for data transmission purposes;
   wherein said step of identifying further comprises the steps of:
   (c) determining which of said channels in said AMPS are not being utilized by said voice transceivers; and
   (d) placing each of said channels that is not being utilized by a voice transceiver into an assignment pool from which a channel is assigned for data transmission purposes;
   wherein said step of assigning further comprises the steps of:
   (e) selecting an available channel from said pool to be used for data transmission purposes;
   (f) tuning a data transceiver to the selected channel; and
   (g) transmitting data, via said data transceiver, over said selected channel;
   the method further comprising the steps of:
   (h) determining if a particular voice transceiver in said set of cellular telephone voice transceivers, tuned to a channel selected for data transmission purposes, is demanding the selected channel; and
   (i) terminating any data transmission on said selected channel whenever said particular voice transceiver has been determined to be demanding the selected channel.

7. A method as set forth in claim 6 further comprising the step of removing said selected channel from said assignment pool whenever said particular voice transceiver has been determined to be demanding the selected channel.

8. A method as set forth in claim 6 wherein said step of determining further comprises the step of sensing RF signals on the channel associated with said particular voice transceiver in said set of cellular telephone voice transceivers.

9. Apparatus for performing Cellular Data Networking (CDN) in an Advanced Mobile Telephone System (AMPS), wherein said AMPS includes a set of cellular telephone voice transceivers each tuned to one of a preselected set of communication channels, and means for coupling each transceiver in said set of transceivers to an antenna to facilitate the performance of duplex radio communications over said set of channels, comprising:

(a) at least one data transceiver;
(b) a set of sensors coupled to each transceiver in said set of transceivers, to determine when there is unused air time to switch a given one of said at least one data transceiver onto the channel to which a particular one of the transceivers in said set of transceivers is tuned, said set of sensors also used to determine when to turn said given data transceiver off based on sensing a demand for the channel to which the given data transceiver is tuned by said particular transceiver;
(c) means for identifying time slots that are unused by said AMPS on each of said channels; and
(d) means for assigning, coupled to said means for identifying, selected unused time slots for data transmission purposes.

10. Apparatus as set forth in claim 9 wherein said means for identifying further comprises:

(a) means for determining which of said channels in said AMPS are not being utilized by said voice transceivers; and
(b) means for placing each of said channel that is not being utilized by a voice transceiver into an assignment pool from which a channel is assigned for data transmission purposes.

11. Apparatus as set forth in claim 10 wherein said means for assigning further comprises:

(a) means for selecting an available channel from said pool to be used for data transmission purposes;
(b) a set of data transceivers; and
(c) means for tuning a particular data transceiver, in said set of data transceivers, to a selected channel.

12. Apparatus as set forth in claim 11 wherein said means for identifying further comprises a monitor receiver.

13. Apparatus as set forth in claim 11 wherein said means for identifying comprises at least one RF sensor.

14. Apparatus as set forth in claim 13 wherein said means for assigning further comprises a digital computer, coupled to said at least one RF sensor, wherein said digital computer is capable of analyzing RF sensor input to determine which of the channels assigned to the respective voice transceivers are not being used.

15. Apparatus for performing Cellular Data Networking (CDN) in an Advanced Mobile Telephone System (AMPS), wherein said AMPS includes a set of cellular telephone voice transceivers, each tuned to one of a preselected set of communication channels, and means for coupling each transceiver in said set of transceivers to an antenna to facilitate the performance of duplex radio communications over said set of channels, comprising:

(a) means for identifying time slots that are unused by said AMPS on each of said channels;
(b) means for assigning, coupled to said means for identifying, selected unused time slots for data transmission purposes;
wherein said means for identifying further comprises:
(c) means for determining which of said channels in said AMPS are not being utilized by said voice transceivers; and
(d) means for placing each of said channel that is not being utilized by a voice transceiver into an assignment pool from which a channel is assigned for data transmission purposes;
wherein said means for assigning further comprises:
(e) means for selecting an available channel from said pool to be used for data transmission purposes;
(f) a set of data transceivers; and
(g) means for tuning a particular data transceiver, in said set of data transceivers, to a selected channel;
wherein said means for identifying further comprises a monitor receiver;
The apparatus further comprising:
(h) means for determining if a particular voice transceiver in said set of cellular telephone voice transceivers, tuned to a channel selected for data transmission purposes, is demanding the selected channel;
(i) means for terminating any data transmission on said selected channel whenever said particular voice transceiver has been determined to be demanding the selected channel; and
(j) means for removing said selected channel from said assignment pool, coupled to said means for determining and said means for terminating, whenever said particular voice transceiver has been determined to be demanding the selected channel.

16. Apparatus as set forth in claim 15 wherein said means for determining comprises a switch receiver.

17. Apparatus as set forth in claim 15 wherein said means for terminating comprises a digital computer coupled to said switch receiver.

18. Apparatus as set forth in claim 15 wherein said means for removing comprises a digital computer coupled to said particular data transceiver.

19. Apparatus for performing Cellular Data Networking (CDN) in an Advanced Mobile Telephone System (AMPS), wherein said AMPS includes a set of cellular telephone voice transceivers, each tuned to one of a preselected set of communication channels, and means for coupling each transceiver in said set of transceivers to an antenna to facilitate the performance of duplex radio communications over said set of channels, comprising:

(a) a set of CDN companion data transceivers each of which is utilized in place of a transceiver in said set of voice transceivers;
(b) a set of RF sensors, each for detecting the presence of RF signals on the channel to which a given transceiver in said set of voice transceivers, is tuned; and
(c) analyzer means, coupled to said set of RF sensors, for determining the presence of an RF signal on the channel to which a particular transceiver in said set of voice transceivers is tuned and for selectively assigning a companion data transceiver to occupy the same frequency as said particular transceiver, for data transmission purposes, in an unused time slot;

said sensors determining when there is unused air time to switch said companion data transceiver onto the frequency to which said particular voice transceiver is tuned, said set of sensors also used to determine when to turn said companion data transceiver off based on sensing a demand for the channel to which the companion data transceiver is tuned by said particular voice transceiver.

20. Apparatus as set forth in claim 19 wherein said analyzer means further comprises means for maintaining a record of which channels in said AMPS are not being actively utilized by said set of cellular voice transceivers based on input from said set of RF sensors.

21. Apparatus for performing Cellular Data Networking (CDN) in an Advanced Mobile Telephone System (AMPS), wherein said AMPS includes a set of cellular telephone voice transceivers, each tuned to one of a preselected set of communication channels, and means for coupling each transceiver in said set of transceivers to an antenna to facilitate the performance of duplex radio communications over said set of channels, comprising:

(a) a set of CDN companion data transceivers each of which is utilized in place of a transceiver in said set of voice transceivers;

(b) a set of RF sensors, each for detecting the presence of RF signals on the channel to which a given transceiver in said set of voice transceivers is tuned;

(c) analyzer means, coupled to said set of RF sensors, for determining the presence of an RF signal on the channel to which a particular transceiver in said set of voice transceivers is tuned and for selectively assigning a companion data transceiver to occupy the same frequency as said particular transceiver, for data transmission purposes, in an unused time slot;

wherein said analyzer means further comprises means for maintaining a record of which channels in said AMPS are not being actively utilized by said set of cellular voice transceivers based on input from said set of RF sensors; and wherein said analyzer means further comprises means for switching an active companion data transceiver off whenever the companion voice transceiver operating at the same frequency demands the channel.

22. A method for performing Cellular Data Networking (CDN) in an Advanced Mobile Telephone System (AMPS), wherein said AMPS includes a set of cellular telephone voice transceivers, each tuned to one of a preselected set of communication channels, and means for coupling each transceiver in said set of transceivers to an antenna to facilitate the performance of duplex radio communications over said set of channels, comprising the steps of:

(a) detecting the presence of RF signals on said set of channels;

(b) determining the presence of an RF signal on the channel to which a particular transceiver in said set of voice transceivers is tuned from the detected presence of RF signals on said set of channels; and (c) selectively assigning a companion data transceiver associated with said particular transceiver to occupy the same frequency as said particular transceiver, for data transmission purposes, in an unused time slot;

(d) determining when there is unused air time to switch said companion data transceiver onto the frequency to which said particular voice transceiver is tuned;

determining when to turn said companion data transceiver off based on sensing a demand for the channel to which the companion data transceiver is tuned by said particular voice transceiver.

23. A method as set forth in claim 22 further comprising the step of maintaining a record of which channels in said AMPS are not being actively utilized by said set of cellular voice transceivers based on input from said set of RF sensors.

24. A method for performing Cellular Data Networking (CDN) in an Advanced Mobile Telephone System (AMPS), wherein said AMPS includes a set of cellular telephone voice transceivers, each tuned to one of a preselected set of communication channels, and means for coupling each transceiver in said set of transceivers to an antenna to facilitate the performance of duplex radio communications over said set of channels, comprising the steps of:

(a) detecting the presence of RF signals on said set of channels;

(b) determining the presence of an RF signal on the channel to which a particular transceiver in said set of voice transceivers is tuned from the detected presence of RF signals on said set of channels;

(c) selectively assigning a companion data transceiver associated with said particular transceiver to occupy the same frequency as said particular transceiver, for data transmission purposes, in an unused time slot;

(d) maintaining a record of which channels in said AMPS are not being actively utilized by said set of cellular voice transceivers based on input from said set of RF sensors; and (e) switching an active companion data transceiver off whenever the companion voice transceiver operating at the same frequency demands the channel.

25. A Digital Cellular Overlay Network (DCON), for supporting the performance of Cellular Data Networking (CDN) in an underlying Advanced Mobile Telephone System (AMPS), between a host processor and a set of data radios (DRs) within range of said AMPS, wherein said AMPS includes a set of cell sites, and further wherein each of said cell sites includes a set of cellular telephone voice transceivers, each tuned to one of a preselected set of communication channels, and means for coupling each transceiver in said set of transceivers to an antenna to facilitate the performance of duplex radio communications over said set of channels with each DR located within range of said AMPS, comprising:

(a) at least one data transceiver;

(b) a set of sensors coupled to each transceiver in said set of transceivers, to determine when there is unused air time to switch a given one of said at least one data transceiver onto the channel to which a particular one of the transceivers in said set of transceivers is tuned, said set of sensors also used to determine when to turn said given data transceiver off based on sensing a demand for the channel to which the given data transceiver is tuned by said particular transceiver;

(c) host processing means capable of executing applications software and engaging in data communications with a data radio in said set of data radios; and (d) a Digital Mobile Telephone Switching Office (DMTSO), coupled between said host processing means and the set of cell sites included in said AMPS, for managing the data network between said host processing means and each cell site.

26. Apparatus as set forth in claim 25 wherein said DMTSO is operative to receive messages from said host processing means and direct the messages to host specified target data radios via the cell sites in which the target data radios are located.

27. Apparatus as set forth in claim 26 wherein said DMTSO is operative to receive return messages from said data radios, received via said cell sites, and is further operative to transmit said return messages to said host processing means, including an identification of the data radio transmitting a given return message.

28. Apparatus as set forth in claim 27 wherein said DMTSO includes network manager means for managing the data network between said host processing means and said set of cell sites by utilizing information accessible to said network manager means which indicates the most likely cells in which a data radio can be reached.

29. Apparatus as set forth in claim 28 said network manager means has access to information regarding all cell sites that surround a given cell site so that a given data radio can be located by the DMTSO when roaming between cell sites.

30. Apparatus as set forth in claim 29 said network manager means has access to information regarding a set of nicknames to uniquely identify each data radio and reduce the addressing overhead of said network manager.

31. Apparatus as set forth in claim 27 wherein said DMTSO receives an acknowledgement signal from the cell to which a message is directed for a particular data radio if and only if the message is actually received by the particular data radio without error.

32. Apparatus as set forth in claim 31 wherein said acknowledgement signal includes dotting sequence, word synchronization and data radio identification information.

33. Apparatus as set forth in claim 31 wherein said DMTSO receives a non-acknowledgement signal from the cell to which a message is directed for a particular data radio whenever an acknowledgement signal can not be generated.

34. Apparatus as set forth in claim 33 wherein said non-acknowledgement signal includes dotting sequence, word synchronization and data radio identification information.

35. Apparatus as set forth in claim 25 further comprising:
(a) means for identifying, located at each of said cell sites, time slots that are unused and unusable by said AMPS on each of said channels assigned to a particular cell site; and
(b) means for assigning, located at each of said cell sites and coupled to said means for identifying, selected unused and unusable time slots for data transmission purposes to thereby facilitate the performance of CDN.

36. Apparatus as set forth in claim 35 wherein said means for identifying further comprises:
(a) means for determining which of said channels assigned to a particular cell site in said AMPS are not being utilized by the voice transceivers located at the particular cell site; and
(b) means for placing each of said channel that is not being utilized by a voice transceiver into an assignment pool from which a channel may be assigned for data transmission purposes.

37. Apparatus as set forth in claim 36 wherein said means for assigning further comprises:
(a) means for selecting an available channel from said pool to be used for data transmission purposes;
(b) a set of data transceivers; and
(c) means for tuning a particular data transceiver in said set of data transceivers to a selected channel.

38. Apparatus as set forth in claim 37 wherein said means for identifying further comprises a monitor receiver.

39. Apparatus as set forth in claim 38 wherein said means for identifying comprises at least one RF sensor.

40. Apparatus as set forth in claim 39 wherein said means for assigning further comprises a digital computer, coupled to said at least one RF sensor, wherein said digital computer is capable of analyzing RF sensor input to determine which of the channels assigned to the respective voice transceivers are not being used.

41. A Digital Cellular Overlay Network (DCON), for supporting the performance of Cellular Data Networking (CDN) in an underlying Advanced Mobile Telephone System (AMPS), between a host processor and set of data radios (DRs) within range of said AMPS, wherein said AMPS includes a set of cell sites, and further wherein each of said cell sites includes a set of cellular telephone voice transceivers, each tuned to one of a preselected set of communication channels, and means for coupling each transceiver in said set of transceivers to an antenna to facilitate the performance of duplex radio communications over said set of channels with each DR located within range of said AMPS, comprising:
(a) host processing means capable of executing applications software and engaging in data communications with a data radio in said set of data radios;
(b) a Digital Mobile Telephone Switching Office (DMTSO), coupled between said host processing means and the set of cell sites included in said AMPS, for managing the data network between said host processing means and each cell site;
(c) means for identifying, located at each of said cell sites, time slots that are unused by said AMPS on each of said channels assigned to a particular cell site;
(d) means for assigning, located at each of said cells sites and coupled to said means for identifying, selected unused time slots for data transmission purposes to thereby facilitate the performance of CDN;
wherein said means for identifying further comprises:
(e) means for determining which of said channels assigned to a particular cell site in said AMPS are not being utilized by the voice transceivers located at the particular cell site; and
(f) means for placing each of said channel that is not being utilized by a voice transceiver into an assignment pool from which a channel is assigned for data transmission purposes;
wherein said means for assigning further comprises:
(g) means for selecting an available channel from said pool to be used for data transmission purposes;
(h) a set of data transceivers; and
(i) means for tuning a particular data transceiver in said set of data transceivers to a selected channel;

wherein said means for identifying further comprises a monitor receiver;

the apparatus further comprising:

(j) means for determining if a particular voice transceiver in said set of cellular telephone voice transceivers, tuned to a channel selected for data transmission purposes, is demanding the selected channel;

(k) means for determining any data transmission on said selected channel whenever said particular voice transceiver has been determined to be demanding the selected channel; and (l) means for removing said selected channel from said assignment pool, coupled to said means for determining and said means for terminating, whenever said particular voice transceiver has been determined to be demanding the selected channel.

42. Apparatus as set forth in claim 41 wherein said means for determining comprises a switch receiver.

43. Apparatus as set forth in claim 41 wherein said means for terminating comprises a digital computer coupled to said switch receiver.

44. Apparatus as set forth in claim 41 wherein said means for removing comprises a digital computer coupled to said particular data transceiver.

45. Apparatus as set forth in claim 44 wherein said particular data transceiver, when tuned to said selected channel, continuously transmits an RF data carrier dotting sequence recognizable to said data radios, wherein said dotting sequence is not recognizable to non-data radios in range of said AMPS.

46. Apparatus as set forth in claim 45 wherein each message packet sent to a data radio by said particular data transceiver includes dotting sequence, word synchronization, busy bit, header, body and tail information for respectively synchronizing the data radio to the cell site clock, synchronizing the data radio to the cell site byte frame, controlling data radio input to the cell site, containing addressing and supervisory information, holding the data to be conveyed and ending the message.

47. Apparatus as set forth in claim 46 wherein said busy bit information is contained in a plurality of bits and can be used by the DCON to direct data radio channel switching in addition to controlling data radio input to a cell site.

48. Apparatus as set forth in claim 47 wherein said busy bit information can also be utilized to dedicate a channel to a particular data radio to the exclusion of other data radios tuned to the channel.

49. Apparatus as set forth in claim 46 wherein said data radios are operative to automatically switch to another available data channel, as specified in said header information sent with each message from a cell site, whenever the loss of a data carrier is detected.

50. Apparatus as set forth in claim 46 wherein each cell site further comprises control means for generating a first busy bit code when the cell site is ready to receive data input from a data radio, and for generating a second busy bit code when the cell site receives a data message from a data radio so that any other data radio within range of the AMPS will be prevented from transmitting data to the cell site on the occupied channel.

51. Apparatus as set forth in claim 50 wherein each data radio in said AMPS determines when to switch from one cell site to another.

52. Apparatus as set forth in claim 51 wherein the determination for a data radio to switch from one cell site to another is based on signal strength, data error rate and channel utilization criteria.

53. A Digital Cellular Overlay Network (DCON), for supporting the performance of Cellular Data Networking (CDN) in an underlying Advanced Mobile Telephone System (AMPS), between a host processor and a set of data radios (DRs) within range of said AMPS, wherein said AMPS includes a set of cell sites, and further wherein each of said cell sites includes a set of cellular telephone voice transceivers, each tuned to one of a preselected set of communication channels, and means for coupling each transceiver in said set of transceivers to an antenna to facilitate the performance of duplex radio communications over said set of channels with each DR located within range of said AMPS, comprising:

(a) host processing means capable of executing applications software and engaging in data communications with a data radio in said set of data radios;

(b) a Digital Mobile Telephone Switching Office (DMTSO), coupled between said host processing means and the set of cell sites included in said AMPS, for managing the data network between said host processing means and each cell site;

(c) a set of CDN companion data transceivers, each of which is utilized in place of a transceiver in the set of voice transceivers located at each cell site;

(d) a set of RF sensors, each for detecting the presence of RF signals on the channel to which a given transceiver in a given set of voice transceivers is tuned; and (e) analyzer means, coupled to said set of RF sensors, for determining the presence of an RF signal on the channel to which a particular transceiver in said given set of voice transceivers is tuned and for selectively assigning a companion data transceiver to occupy the same frequency as said particular transceiver, for data transmission purposes, in an unused time slot;

said sensors determining when there is unused air time to switch said companion data transceiver onto the frequency to which said particular voice transceiver is tuned, said set of sensors also used to determine when to turn said companion data transceiver off based on sensing a demand for the channel to which the companion data transceiver is tuned by said particular voice transceiver.

54. Apparatus as set forth in claim 53 wherein said analyzer means further comprises means for maintaining a record of which channels in said AMPS are not being actively utilized by the set of cellular voice transceivers located at each cell site based on input from said set of RF sensors.

55. A Digital Cellular Overlay Network (DCON), for supporting the performance of Cellular Data Networking (CDN) in an underlying Advanced Mobile Telephone System (AMPS), between a host processor and a set of data radios (DRs) within range of said AMPS, wherein said AMPS includes a set of cell sites, and further wherein each of said cell sites includes a set of cellular telephone voice transceivers, each tuned to one of a preselected set of communication channels, and means for coupling each transceiver in said set of transceivers to an antenna to facilitate the performance of duplex radio communications over said set of channels with each DR located within range of said AMPS, comprising:
  (a) host processing means capable of executing applications software and engaging in data communications with a data radio in said set of data radios;
  (b) a Digital Mobile Telephone Switching Office (DMTSO), coupled between said host processing means and the set of cell sites included in said AMPS, for managing the data network between said host processing means and each cell site;
  (c) a set of CDN companion data transceivers, each of which is utilized in place of a transceiver in the set of voice transceivers located at each cell site;
  (d) a set of RF sensors, each for detecting the presence of RF signals on the channel to which a given transceiver in a given set of voice transceivers is tuned; and
  (e) analyzer means, coupled to said set of RF sensors, for determining the presence of an RF signal on the channel to which a particular transceiver in said given set of voice transceivers is tuned and for selectively assigning a companion data transceiver to occupy the same frequency as said particular transceiver, for data transmission purposes, in an unused time slot;
  wherein said analyzer means further comprises means for maintaining a record of which channels in said AMPS are not being actively utilized by the set of cellular voice transceivers located at each cell site based on input from said set of RF sensors; and
  said analyzer means further comprises means for switching an active companion data transceiver off whenever the companion voice transceiver operating at the same frequency demands the channel.

56. A method of operating a Digital Cellular Overlay Network (DCON) that supports the performance of Cellular Data Networking (CDN) in an underlying Advanced Mobile Telephone System (AMPS) between a host processor and a set of data radios (DRs) within range of said AMPS, wherein said AMPS includes a set of cell sites, and further wherein each of said cell sites includes a set of cellular telephone voice transceivers, each tuned to one of a preselected set of communication channels, and means for coupling each transceiver in said set of transceivers to an antenna to facilitate the performance of duplex radio communications over said set of channels with any DR located within range of said AMPS, including at least one data transceiver and a set of sensors coupled to each transceiver in said set of transceivers, comprising the steps of:
  (a) determining when there is unused air time to switch a given one of said at least one data transceiver onto the frequency to which a particular one of the transceivers in said set of transceivers is tuned;
  (b) determining when to turn said given data transceiver off based on sensing a demand for the channel to which the given data transceiver is tuned by said particular transceiver;
  (c) combining a unique data radio identification signal with data being processed by an application program running on said host processor; and
  (d) outputting a message that includes the combined radio identification signal and data, under the control of said host processor, to a predetermined target Digital Mobile Telephone Switching Office (DMTSO).

57. A method as set forth in claim 56 wherein said step of outputting a message further comprises the steps of:
  (a) including a DMTSO identification signal, to identify the target DMTSO, as part of said message; and
  (b) embedding said message between a first header and a first trailer packet of information to delineate the beginning and the end of the message to the target DMTSO.

58. A method of operating a Digital Cellular Overlay Network (DCON) that supports the performance of Cellular Data Networking (CDN) in an underlying Advanced Mobile Telephone System (AMPS) between a host processor and a set of data radios (DRs) within range of said AMPS, wherein said AMPS includes a set of cell sites, and further wherein each of said cell sites includes a set of cellular telephone voice transceivers, each tuned to one of a preselected set of communication channels, and means for coupling each transceiver in said set of transceivers to an antenna to facilitate the performance of duplex radio communications over said set of channels with any DR located within range of said AMPS, comprising the steps of:
  (a) combining a unique data radio identification signal with data being processed by an application program running on said host processor;
  (b) outputting a message that includes the combined radio identification signal and data, under the control of said host processor, to a predetermined target Digital Mobile Telephone Switching Office (DMTSO);
  wherein said step of outputting a message further comprises the steps of:
  (c) including a DMTSO identification signal, to identify the target DMTSO, as part of said message; and
  (d) embedding said message between a first header and a first trailer packet of information to delineate the beginning and the end of the message to the target DMTSO;
  the method further comprising the steps of:
  (e) removing, at the target DMTSO, the first header packet, first trailer packet, and DMTSO identification signal from said message;
  (f) determining, at the target DMTSO, which cell in said set of cells to send the data to;
  (g) formulating a new message, at the target DMTSO, that includes the combined radio identification signal and data, together with a unique target cell site identification signal;
  (h) embedding said new message between a second header and a second trailer packet of information to delineate the beginning and the end of the message to the target cell site; and
  (i) outputting the new message to the target cell site specified in said new message.

59. A method as set forth in claim 58 wherein said step of determining is performed by said DMTSO by utilizing a Path Table.

60. A method as set forth in claim 59 further comprising the step of utilizing said DMTSO to monitor the target cell site for data acknowledgement signals which indicate that data was properly received by the target data radio.

61. A method as set forth in claim 60 further comprising the step of further utilizing said Path Table to determine at least one alternate target cell site in instances where data was not properly received by a target data radio.

62. A method as set forth in claim 59 further comprising the steps of:
   (a) removing, at the target cell site, the second header packet, second trailer packet, and cell site identification signal from said new message;
   (b) formulating a radio target message that includes the combined radio identification signal, data, a dotting sequence, word synchronization information, Activity Table information, error detection/correction information and at least one busy bit between each of the aforementioned components of the radio target message; and
   (c) transmitting the radio target message to the target data radio as specified by the unique radio identification signal, utilizing a companion data transceiver tuned to a frequency normally assigned to a particular voice transceiver in said set of transceivers.

63. A method as set forth in claim 62 further comprising the steps of:
   (a) monitoring said particular voice transceiver to determine if a demand for the channel to which it is normally assigned occurs; and
   (b) updating Activity Table information relating to the availability of channels for CDN type data communications in the DCON.

64. A method as set forth in claim 63 further comprising the steps of:
   (a) synchronizing the target data radio on the dotting sequence transmitted as part of said radio target message;
   (b) performing byte frame synchronization at said target data radio utilizing the word synchronization information transmitted as part of said radio target message;
   (c) applying error correction/detection to the radio target message, at the target data radio, utilizing the error detection/correction information transmitted as part of said radio target message; and
   (d) storing the Activity Table information transmitted as part of said radio target message, at the target data radio.

65. A method as set forth in claim 64 further comprising the step of passing the unique radio identification signal and data, transmitted as part of said radio target message, to data radio emulator software.

66. A method as set forth in claim 65 further comprising the steps of:
   (a) utilizing said target data radio to monitor the data carrier; and
   (b) utilizing the Activity Table information stored at the target data radio to recover if the carrier is lost.

67. A method as set forth in claim 66 further comprising the step of utilizing the emulator software to pass the data to application software if the unique radio identification signal transmitted as part of said radio target message is the same as the identification number actually assigned to the target data radio.

68. A method of operating a Digital Cellular Overlay Network (DCON) that supports the performance of Cellular Data Networking (CDN) in an underlying Advanced Mobile Telephone System (AMPS) between a host processor and a set of data radios (DRs) within range of said AMPS, wherein said AMPS includes a set of cell sites, and further wherein each of said cell sites includes a set of cellular telephone voice transceivers each tuned to one of a preselected set of communication channels, and means for coupling each transceiver in said set of transceivers to an antenna to facilitate the performance of duplex radio communications over said set of channels with any DR located within range of said AMPS, including at least one data transceiver, and a set of sensors coupled to each transceiver in said set of transceivers, comprising the steps of:
   (a) determining when a transceiver is inactive to switch a given one of said at least one data transceiver onto the channel to which a particular one of the voice transceivers in said set of transceivers is tuned;
   (b) determining when to turn said given data transceiver off based on sensing a demand for the channel to which the given data transceiver is tuned by said particular transceiver;
   (c) combining a unique data radio identification signal with data being processed by an application program associated with a data radio, utilizing data radio emulator software; and
   (d) outputting a message that includes the combined radio identification signal and data, under the control of said radio emulator software, to the data radio.

69. A method as set forth in claim 68 further comprising the steps of:
   (a) formulating a new message to be transmitted by said data radio to the home cell site within which the data radio is located, wherein said new message includes a dotting sequence, word synchronization information, and error detection/correction code information;
   (b) monitoring home cell site transmissions for a busy bit condition code indicating that the new message may be transmitted by the data radio toward the home cell site; and
   (c) transmitting the new message to the home cell site upon detection of a busy bit condition code indicating that the new message may be transmitted thereto.

70. A method as set forth in claim 69 further comprising the steps of:
   (a) continuing to monitor the busy bit condition code transmitted by said home cell site; and
   (b) recovering if said code changes before the new message being transmitted to the home cell site ends.

71. A method of operating a Digital Cellular Overlay Network (DCON) that supports the performance of Cellular Data Networking (CDN) in an underlying Advanced Mobile Telephone System (AMPS) between a host processor and a set of data radios (DRs) within range of said AMPS, wherein said AMPS includes a set of cell sites, and further wherein each of said cells sites includes a set of cellular telephone voice transceivers each tuned to one of a preselected set of communication channels, and means for coupling each transceiver in said set of transceivers to an anennna to facilitate the performance of duplex radio communications over said set of channels with any DR located within range of said AMPS, comprising the steps of:
   (a) combining a unique data radio identification signal with data being processed by an application program associated with a data radio, utilizing data radio emulator software;
   (b) outputting a message that includes the combined radio identification signal and data, under the control of said radio emulator software, to the data radio;

(c) formulating a new message to be transmitted by said data radio to the home cell site within which the data radio is located, wherein said new message includes a dotting sequence, word synchronization information, and error detection/correction code information;

(d) monitoring home cell site transmissions for a busy bit condition code indicating that the new message can be transmitted by the data radio toward the home cell site;

(e) transmitting the new message to the home cell site upon detection of a busy bit condition code indicating that the new message can be transmitted thereto;

(f) continuing to monitor the busy bit condition code transmitted by said home cell site;

(g) retransmitting the new message if said code changes before the new message being transmitted to the home cell site ends;

(h) performing bit synchronization, at the home cell site utilizing the dotting sequence transmitted as part of said new message;

(i) performing word synchronization, at the home cell, site utilizing the word synchronization information transmitted as part of said new message;

(j) performing error detection/correction, at the home cell site, as specified by the error detection/correction information transmitted as part of said new message;

(k) removing the dotting sequence, word synchronization information and error detection/correction information from the new message received by the home cell site;

(l) formulating a DMTSO message that includes a unique identification signal for the home cell site, the radio identification signal and data transmitted as part of said new message to said home cell site, and a first header and first trailer packet that delineates the beginning and the end of the DMTSO message; and (m) transmitting the DMTSO message to a DMTSO coupled to the home cell site.

72. A method as set forth in claim 71 further comprising the steps of:

(a) removing, at the DMTSO coupled to said home cell site, the first header packet, first trailer packet and home cell site identification signal from said DMTSO message;

(b) formulating a host message that includes the radio identification signal and data transmitted as part of said DMTSO message, together with a second header and second trailer packet to delineate the beginning and the end of the host message;

(c) updating a Path Table, utilized by the DMTSO to determine the location of data radios, with the location of the transmitting data radio based on the home cell site identification signal that was transmitted as part of the DMTSO message; and (d) transmitting, via the DMTSO to which said home cell site is coupled, the host message to said host processor.

73. A method as set forth in claim 72 further comprising the steps of:

(a) removing the second header and trailer packets from the host message received by said host processor; and (b) passing the data and radio identification signal included as part of said host message to an application program.

74. A Digital Cellular Overlay Network (DCON), for supporting the performance of Cellular Data Networking (CDN) in an underlying Advanced Mobile Telephone System (AMPS), between a host processor and a set of data radios (DRs) within range of said AMPS, wherein said AMPS includes a set of cell sites, and further wherein each of said cell sites includes a set of cellular telephone voice transceivers, each tuned to one of a preselected set of communication channels, and means for coupling each transceiver in said set of transceivers to an antenna to facilitate the performance of duplex radio communications over said set of channels with each DR located within range of said AMPS, comprising:

(a) at least one data transceiver;

(b) a set of sensors coupled to each transceiver in said set of transceivers, to determine when there is unused air time to switch a given one of said at least one data transceiver onto the channel to which a particular one of the transceivers in said set of transceivers is tuned, said set of sensors also used to determine when to turn said given data transceiver off based on sensing a demand for the channel to which the given data transceiver is tuned by said particular transceiver;

(c) a cell site/data radio interface that is controlled at least in part by busy bit codes generated by a cell site coupled to the interface, wherein each busy bit code comprises a plurality of bits; and (d) a data radio, coupled to said interface, that monitors each busy bit code.

75. Apparatus as set forth in claim 74 wherein said data radio is responsive to said busy bit codes to make decisions on when to transmit data to the cell site over said interface, utilizing a first channel, and when to switch to a second channel in order to further monitor the receipt of busy bit codes over said interface.

76. A method of operating a Digital Cellular Overlay Network (DCON) that supports the performance of Cellular Data Networking (CDN) in an underlying Advanced Mobile Telephone System (AMPS) between a host processor and a set of data radios (DRs) within range of said AMPS, wherein said AMPS includes a set of cell sites, and further wherein each of said cell sites includes a set of cellular telephone voice transceivers, each tuned to one of a preselected set of communication channels, and means for coupling each transceiver in said set of transceivers to an antenna to facilitate the performance of duplex radio communications over said set of channels with any DR located within range of said AMPS, including at least one data transceiver, and a set of sensors coupled to each transceiver in said set of transceivers, comprising the steps of:

(a) determining when there is unused air time to switch a given one of said at least one data transceiver onto the channel to which a particular one of the transceivers in said set of transceivers is tuned;

(b) determining when to turn said given data transceiver off based on sensing a demand for the channel to which the given data transceiver is tuned by said particular transceiver;

(c) controlling at least in part, a cell site/data radio interface by busy bit codes generated by a cell site coupled to the interface, wherein each busy bit code comprises a plurality of bits; and (d) monitoring, via a data radio coupled to said interface, each busy bit code.

77. A method as set forth in claim 76 further comprising the step of operating said data radio in such a manner as to be responsive to said busy bit codes to make decisions on when to transmit data to the cell site over said interface, utilizing a first channel, and when to switch to a second channel in order to further monitor the receipt of busy bit codes over said interface.

78. A Digital Cellular Overlay Network (DCON), for supporting the performance of Cellular Data Networking (CDN) in an underlying Advanced Mobile Telephone System (AMPS), between a host processor and a set of data radios (DRs) within range of said AMPS, wherein said AMPS includes a set of cell sites, and further wherein each of said cell sites includes a set of cellular telephone voice transceivers, each tuned to one of a preselected set of communication channels, and means for coupling each transceiver in said set of transceivers to an antenna to facilitate the performance of duplex radio communications over said set of channels with each DR located within range of said AMPS, comprising:

(a) at least one data transceiver;

(b) a set of sensors coupled to each transceiver in said set of transceivers, to determine when there is unused air time to switch a given one of said at least one data transceiver onto the channel to which a particular one of the transceivers in said set of transceivers is tuned, said set of sensors also used to determine when to turn said given data transceiver off based on sensing a demand for the channel to which the given data transceiver is tuned by said particular transceiver;

(c) at least one data radio, in said set of data radios, that is capable of making handoff decisions within the data radio based on signal strength and bit error rate information as determined by the data radio, measured against signal strength and bit error rate criteria programmed into the data radio.

79. A Digital Cellular Overlay Network (DCON), for supporting the performance of Cellular Data Networking (CDN) in an underlying Advanced Mobile Telephone System (AMPS), between a host processor and a set of data radios (DRs) within range of said AMPS, wherein said AMPS includes a set of cell sites, and further wherein each of said cell sites includes a set of cellular telephone voice transceivers, each tuned to one of a preselected set of communication channels, and means for coupling each transceiver in said set of transceivers to an antenna to facilitate the performance of duplex radio communications over said set of channels with each DR located within range of said AMPS, comprising:

(a) at least one data transceiver; and (b) a set of sensors coupled to each transceiver in said set of transceivers, to determine when there is unused air time to switch a given one of said at least one data transceiver onto the channel to which a particular one of the transceivers in said set of transceivers is tuned;

wherein said set of sensors is also used to determine when to turn said given data transceiver off based on sensing a demand for the channel to which the given data transceiver is tuned by said particular transceiver.

80. A method for performing cellular data networking in a mobile telephone system, wherein said telephone system includes a set of cellular telephone voice transceivers, each tuned to one of a set of communication channels, and means for coupling each transceiver in said set of transceivers to an antenna to facilitate the performance of duplex radio communications over said set of channels, including a data transceiver, and a set of sensors coupled to each transceiver in said set of transceivers, comprising the steps of:

(a) determining when there is unused air time to switch said data transceiver onto the channel to which a particular one of the transceivers in said set of transceivers is tuned;

(b) determining when to turn said data transceiver off based on sensing a demand for the channel to which the data transceiver is tuned by said particular transceiver.

81. Apparatus for performing cellular data networking in a mobile telephone system, wherein said telephone system includes a set of cellular telephone voice transceivers, each tuned to one of a set of communication channels, and means for coupling each transceiver in said set of transceivers to an antenna to facilitate the performance of duplex radio communications over said set of channels, comprising:

(a) a data transceiver;

(b) a set of sensors coupled to each transceiver in said set of transceivers, to determine when there is unused air time to switch said data transceiver onto the channel to which a particular one of the transceivers in said set of transceivers is tuned, said set of sensors also used to determine when to turn said data transceiver off based on sensing a demand for the channel to which the data transceiver is tuned by said particular transceiver.

82. A mobile data radio for performing Cellular Data Networking (CDN) in an Advanced Mobile Telephone System (AMPS), wherein said AMPS includes a set of cellular telephone voice transceivers, each tuned to one of a preselected set of communication channels, and means for coupling each transceiver in said set of transceivers to an antenna to facilitate the performance of duplex radio communications over said set of channels, including at least one data transceiver and a set of sensors coupled to each transceiver in said set of transceivers, to determine when there is unused air time to switch a given one of said at least one data transceiver onto the channel to which a particular one of the transceivers in said set of transceivers is tuned, said set of sensors also used to determine when to turn said given data transceiver off based on sensing a demand for the channel to which the given data transceiver is tuned by said particular transceiver and a busy bit transmission means for indicating that said channel is available for use, said mobile data radio, comprising:

a receiver for receiving messages on said channel, said messages including busy bits indicating whether the channel is available for use;

a busy bit detector coupled to said receiver, for detecting when said channel is available; and a transmitter coupled to said detector for transmitting data on said channel in response to said detector.

* * * * *